United States Patent
Ono et al.

(10) Patent No.: US 9,774,417 B2
(45) Date of Patent: Sep. 26, 2017

(54) POLARIZATION SPLITTING MULTIPLEXING DEVICE, OPTICAL SYSTEM, AND DISPLAY UNIT

(71) Applicant: Sony Corporation, Tokyo (JP)

(72) Inventors: Tomoki Ono, Kanagawa (JP); Mikio Takiguchi, Kanagawa (JP); Atsushi Fukumoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 92 days.

(21) Appl. No.: 14/436,985

(22) PCT Filed: Oct. 25, 2013

(86) PCT No.: PCT/JP2013/006332
§ 371 (c)(1),
(2) Date: Apr. 20, 2015

(87) PCT Pub. No.: WO2014/068934
PCT Pub. Date: May 8, 2014

(65) Prior Publication Data
US 2015/0249521 A1  Sep. 3, 2015

(30) Foreign Application Priority Data

Nov. 2, 2012  (JP) ................. 2012-242836

(51) Int. Cl.
*H04J 14/06*  (2006.01)
*G02B 27/28*  (2006.01)
(Continued)

(52) U.S. Cl.
CPC ............ *H04J 14/06* (2013.01); *G02B 27/283* (2013.01); *G02B 27/48* (2013.01);
(Continued)

(58) Field of Classification Search
CPC ........ G02B 27/28; G02B 27/18; G02B 27/48; H04J 14/06; G03B 21/00; G03B 21/14; H04B 10/25; H04N 5/74
See application file for complete search history.

(56) References Cited

U.S. PATENT DOCUMENTS

2004/0067016 A1  4/2004  Anikitchev et al.
2005/0111772 A1*  5/2005  Du .................... G02B 6/12007
                                                           385/11
(Continued)

FOREIGN PATENT DOCUMENTS

CN           1713022 A    12/2005
CN         101932973 A    12/2010
(Continued)

OTHER PUBLICATIONS

International Search Report issued in connection with International Patent Application No. PCT/JP2013/006332, dated Jan. 29, 2014. (3 pages).

(Continued)

*Primary Examiner* — Sultan Chowdhury
*Assistant Examiner* — Danell L Owens
(74) *Attorney, Agent, or Firm* — K&L Gates LLP

(57) ABSTRACT

An optical system is provided including a light source configured to emit a light; and a polarizing splitting multiplexing device including a first prism configured to split the light into two polarized light beams having different optical path lengths, and a second prism configured to combine the two polarized light beams. The first prism includes a first reflective surface and a first polarization splitting surface facing the first reflective surface, and the second prism includes a second reflective surface and a second polarization splitting surface facing the second reflective surface.

17 Claims, 22 Drawing Sheets

(51) Int. Cl.
  *G02B 27/48*    (2006.01)
  *G03B 21/20*    (2006.01)
  *G03B 33/06*    (2006.01)
  *H04N 9/31*     (2006.01)
  *H04B 10/25*    (2013.01)

(52) U.S. Cl.
  CPC ..... *G03B 21/2033* (2013.01); *G03B 21/2073* (2013.01); *G03B 33/06* (2013.01); *H04B 10/2504* (2013.01); *H04N 9/3129* (2013.01)

(56) References Cited

U.S. PATENT DOCUMENTS

| | | | |
|---|---|---|---|
| 2006/0098283 A1 | 5/2006 | Sato | |
| 2008/0049284 A1 | 2/2008 | Park et al. | |
| 2009/0168818 A1* | 7/2009 | Gollier | G02B 27/283 372/27 |

FOREIGN PATENT DOCUMENTS

| | | |
|---|---|---|
| JP | S57-207219 A | 12/1982 |
| JP | S60-188901 A | 9/1985 |
| JP | 63-073221 | 4/1988 |
| JP | A HEI 01-130104 | 5/1989 |
| JP | H04-250412 A | 9/1992 |
| JP | 2001-296503 | 10/2001 |
| JP | 2004-503923 A | 2/2004 |
| JP | 2004-170550 A | 6/2004 |
| JP | 2009-258207 A | 11/2009 |
| JP | 2010-169830 A | 8/2010 |
| JP | 2010-191173 | 9/2010 |
| JP | T 2011-508286 | 3/2011 |
| WO | 2004/102258 | 11/2004 |

OTHER PUBLICATIONS

Office Action received in JP Application 2012242836, dated Feb. 16, 2016, 6 pages.
Chinese Office Action (with English translation) dated Aug. 31, 2016 issued in corresponding Chinese application No. 2013800560045 (16 pages).
Japanese Office Action dated Sep. 6, 2016 issued in corresponding Japanese application No. 2012-242836 (10 pages).
Japanese Office Action dated Mar. 21, 2017 in corresponding Japanese application No. 2012-242836 (6 pages).

* cited by examiner

[Fig. 1A]
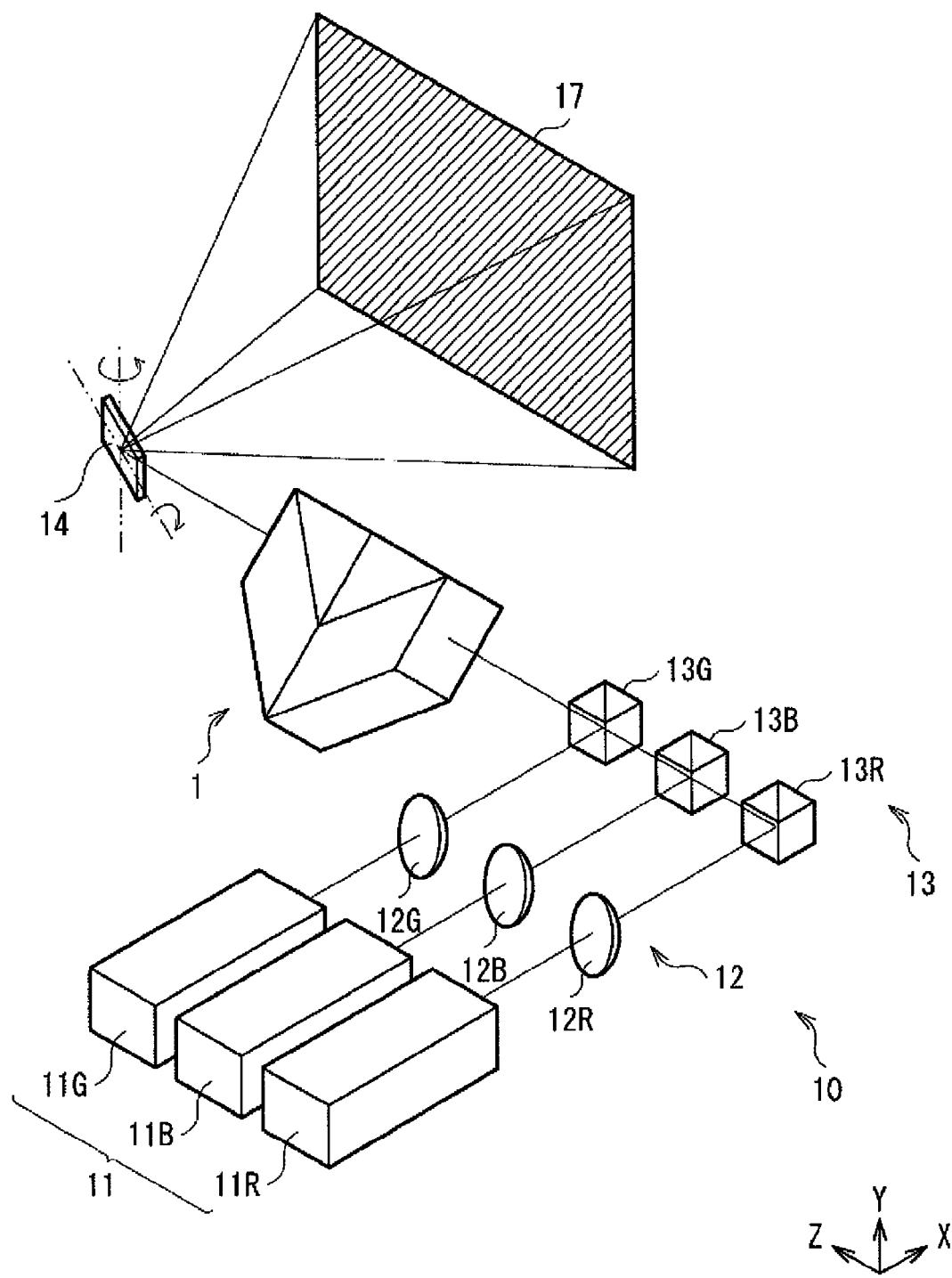

[Fig. 1B]
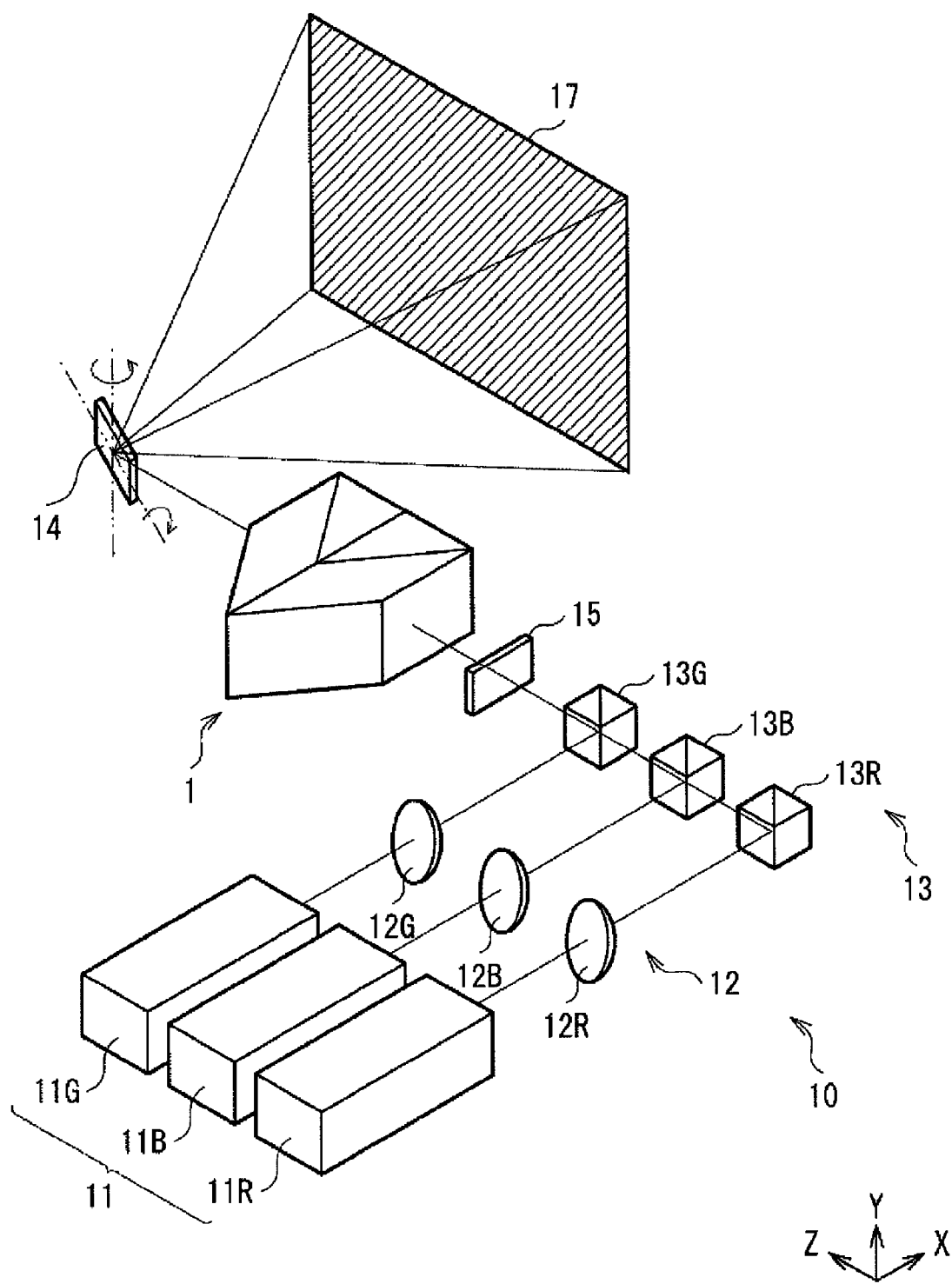

[Fig. 2A]
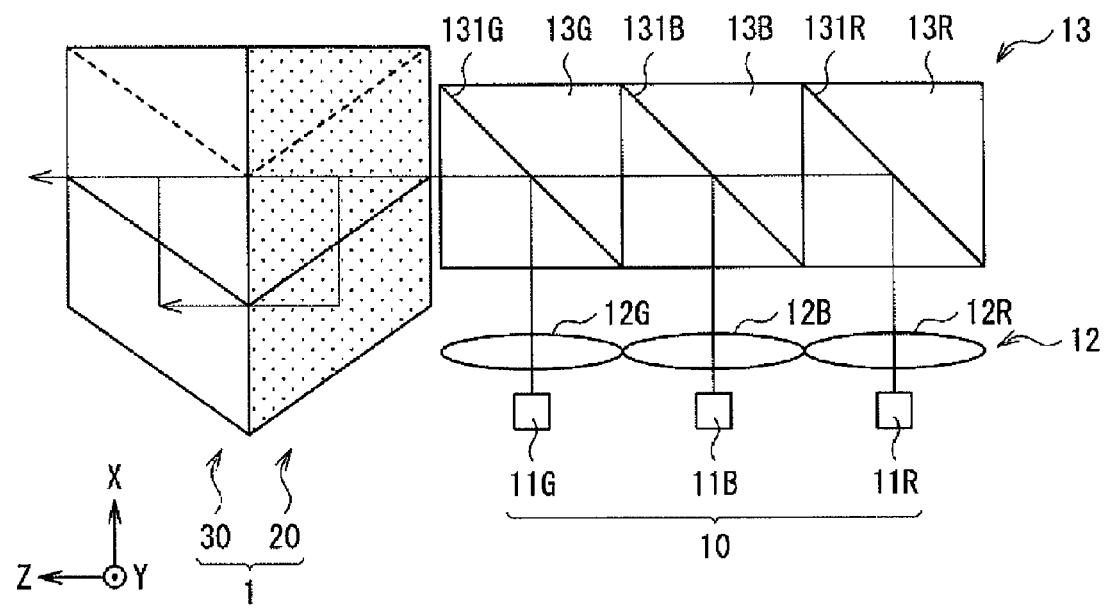
[Fig. 2B]
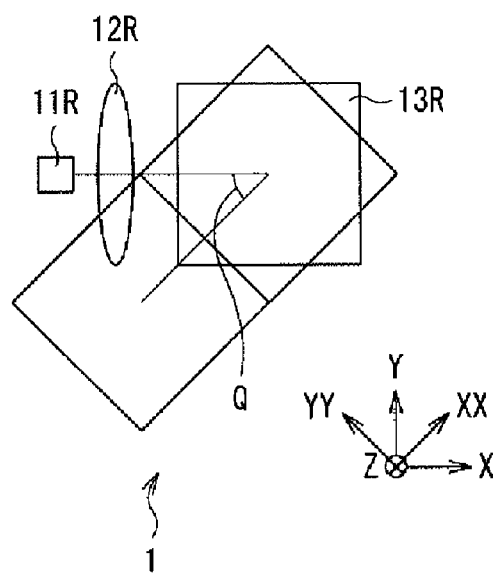

[Fig. 3]
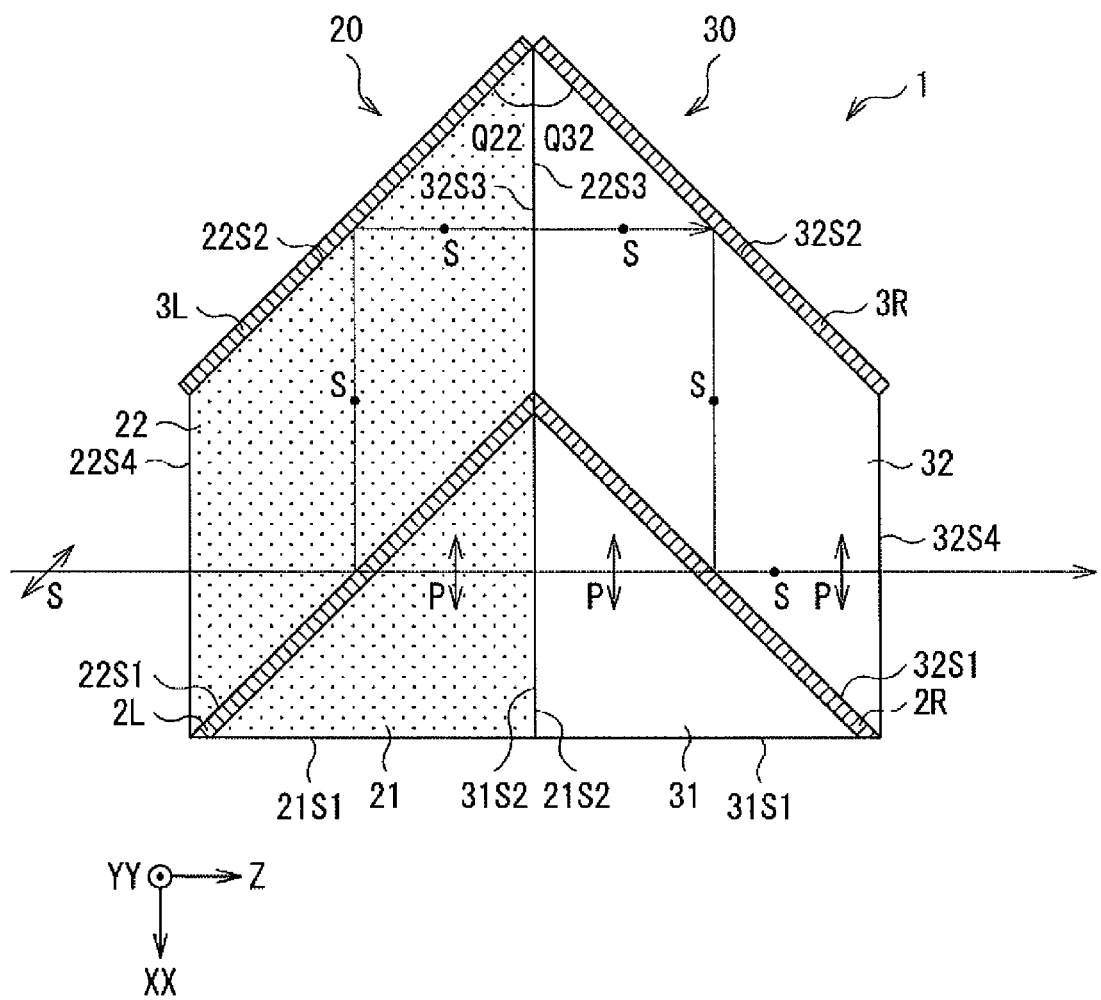

[Fig. 4]
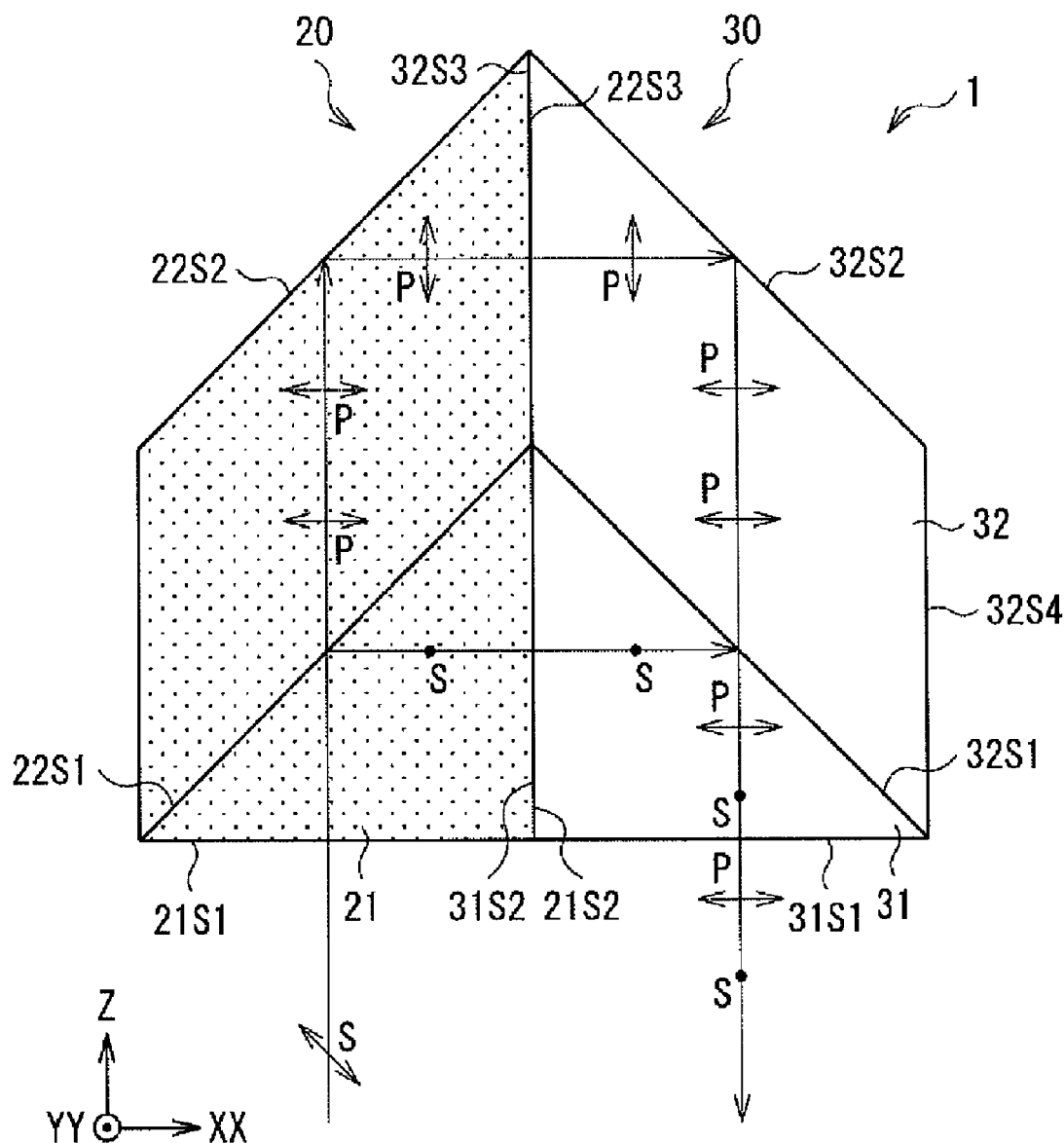

[Fig. 5]
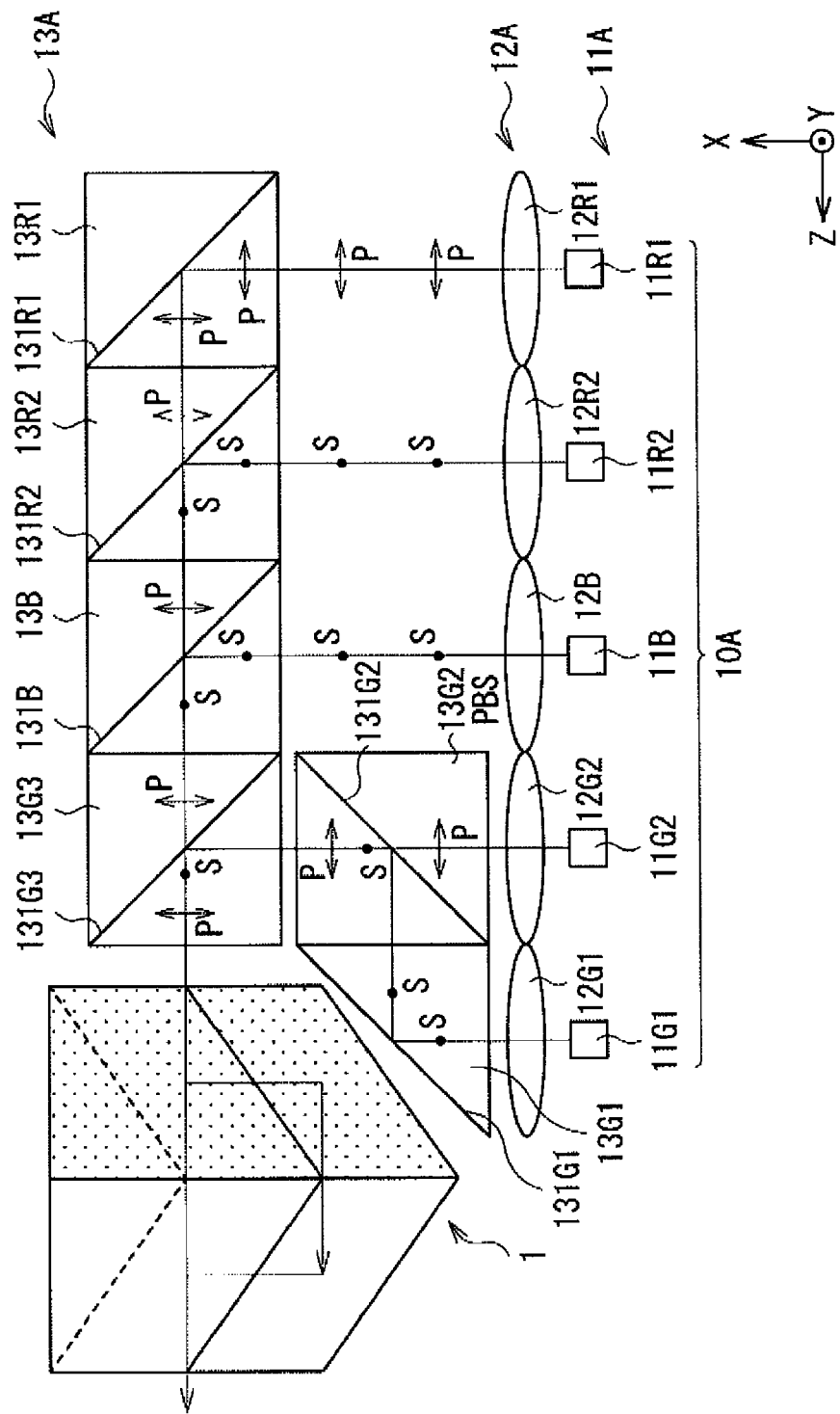

[Fig. 6A]
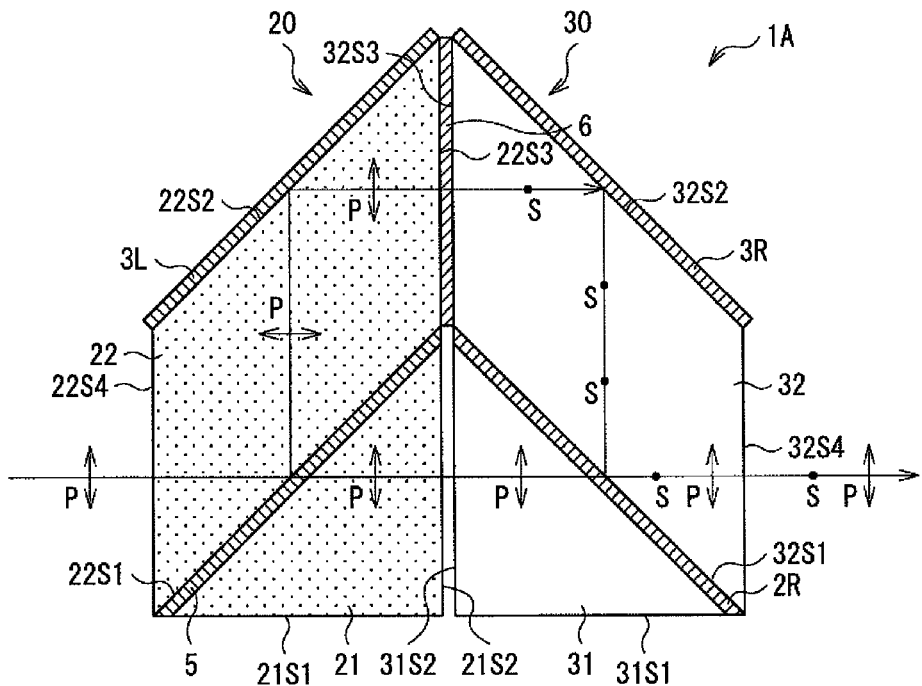
[Fig. 6B]
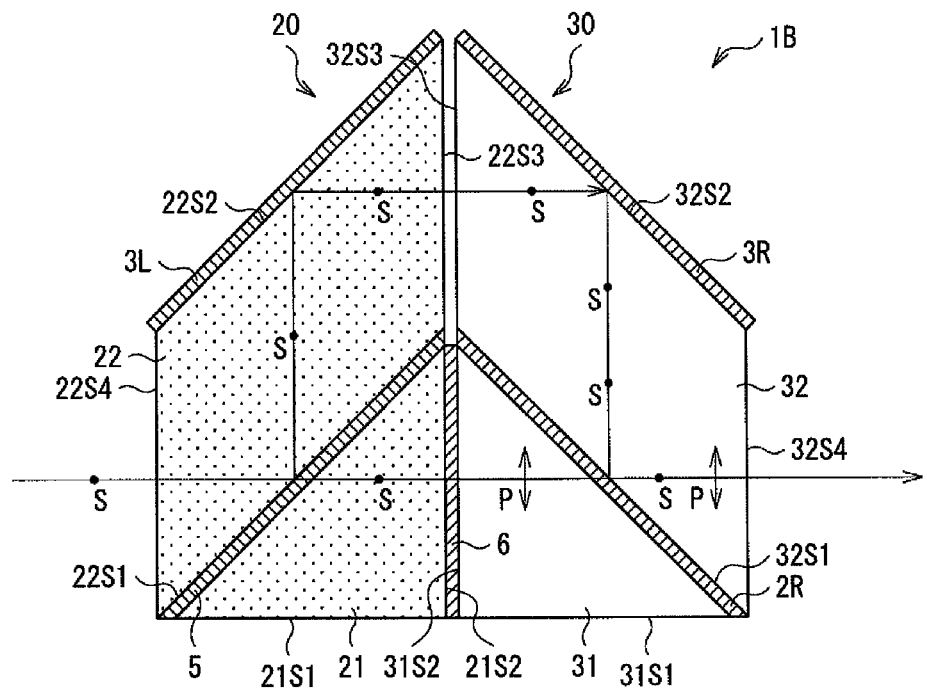

[Fig. 7A]
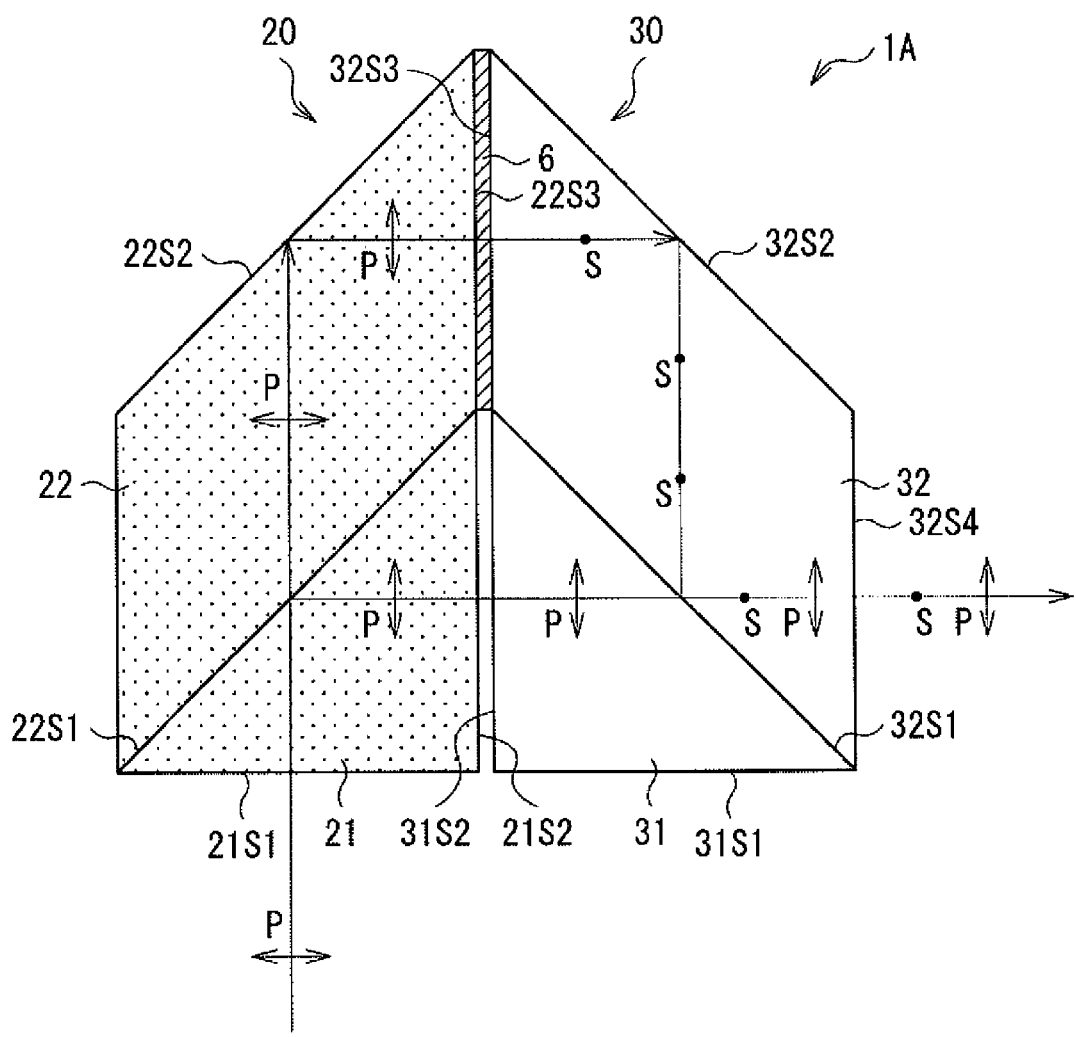

[Fig. 7B]
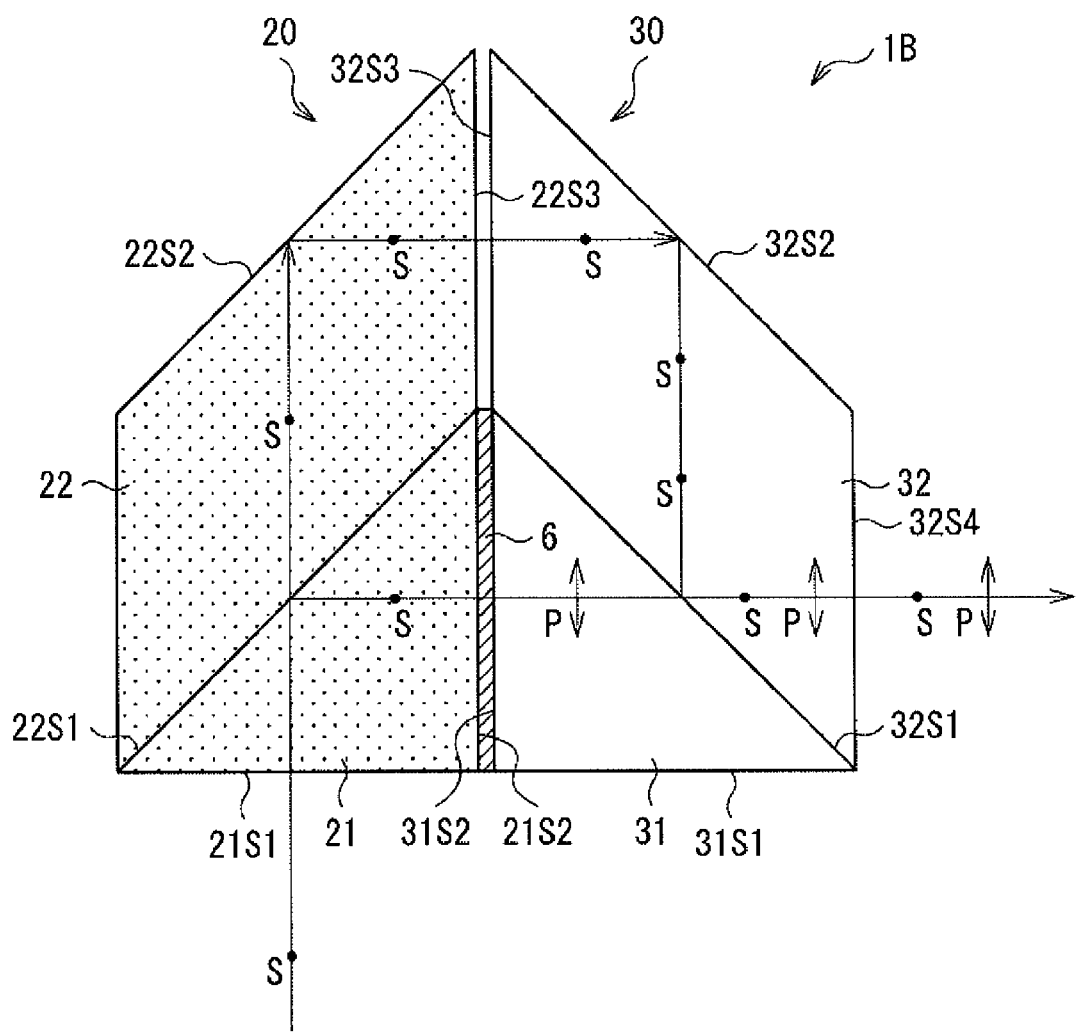

[Fig. 8A]
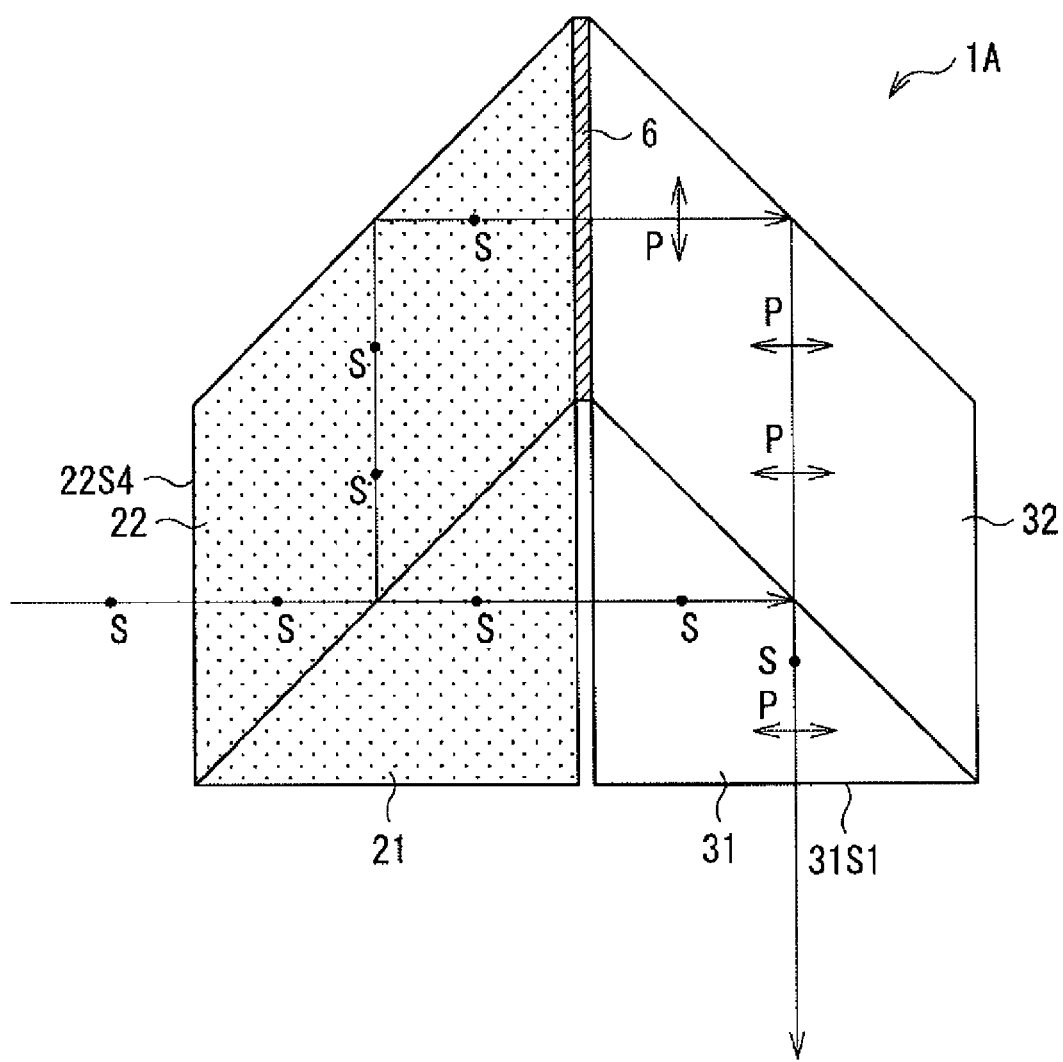

[Fig. 8B]
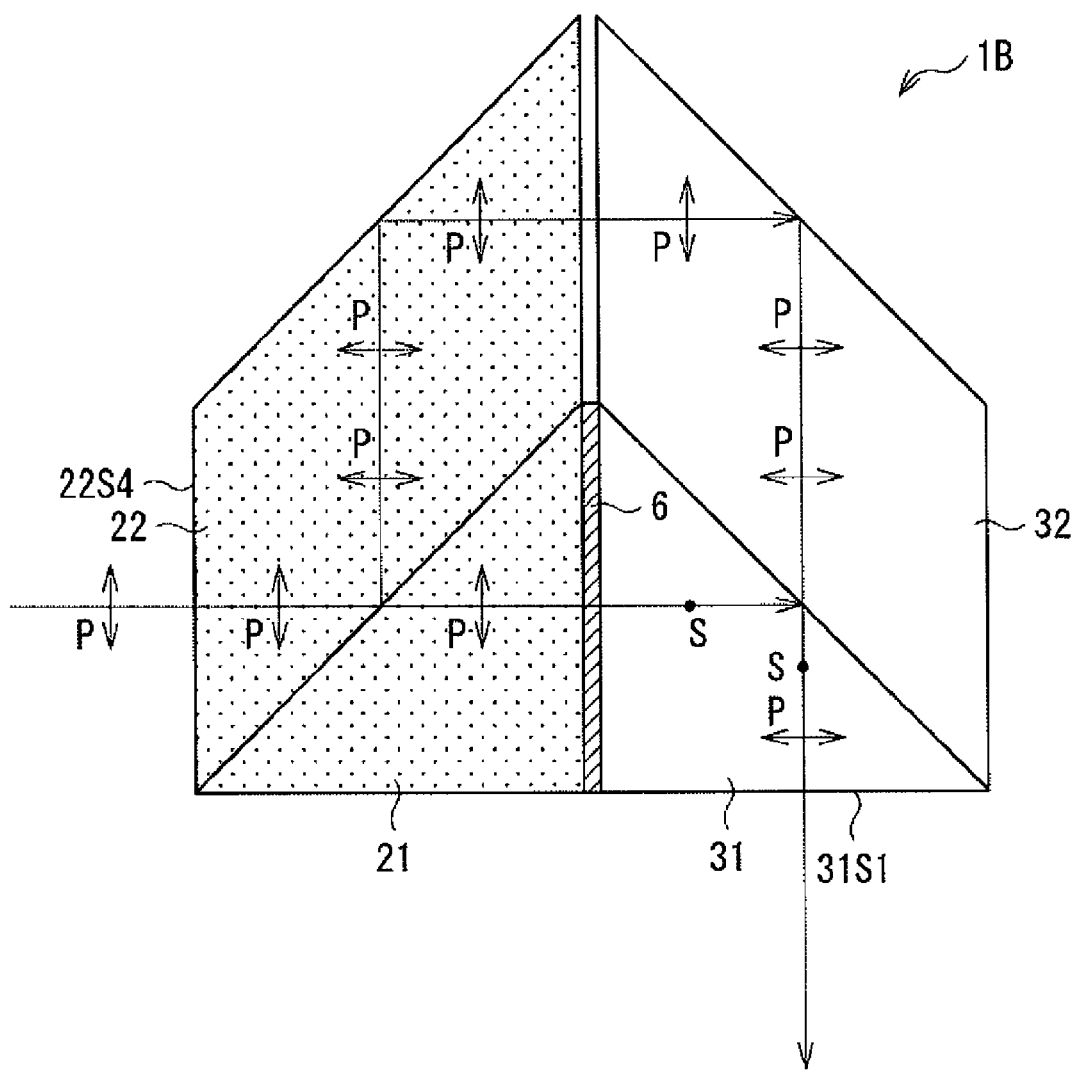

[Fig. 9A]
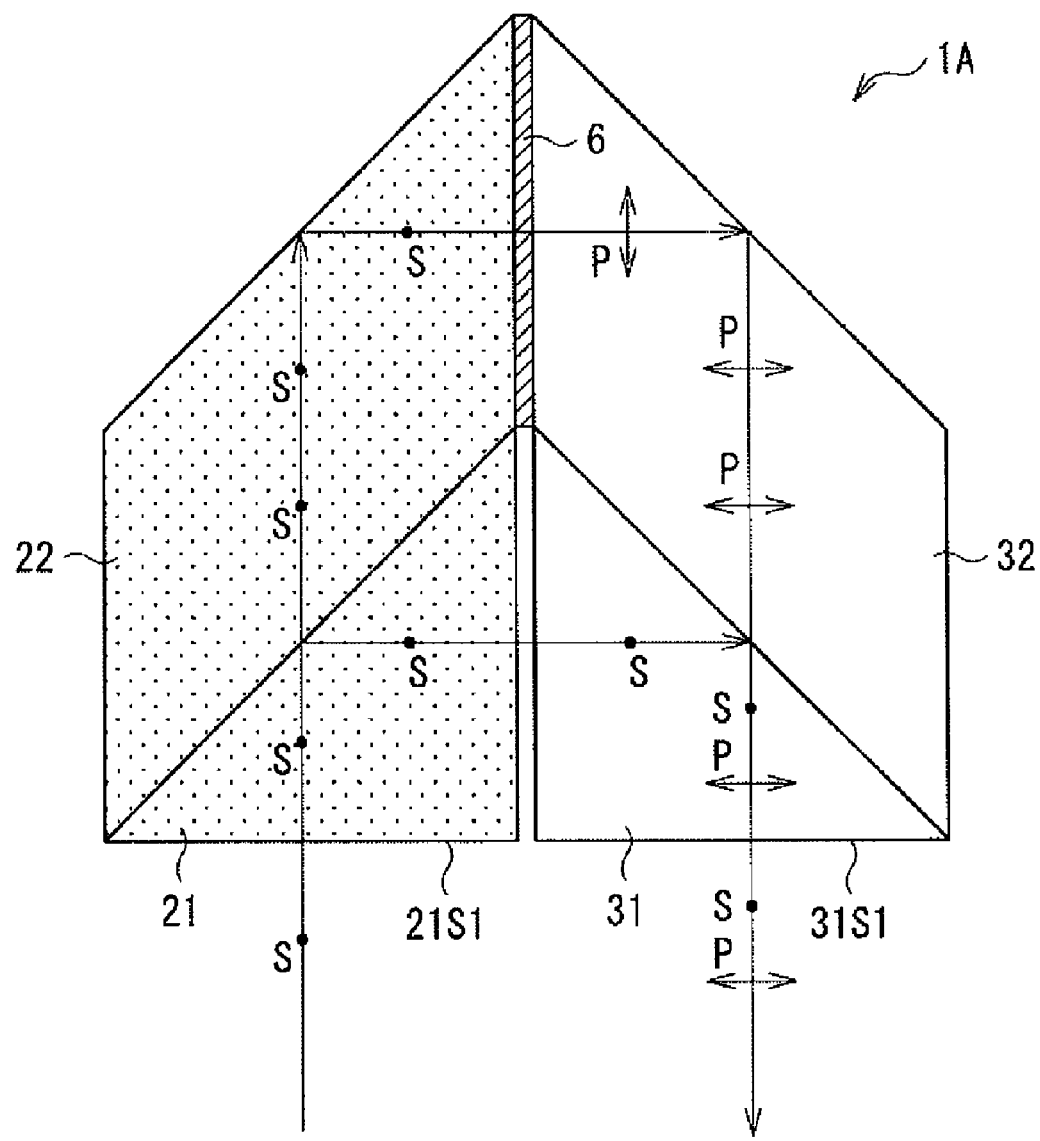

[Fig. 9B]
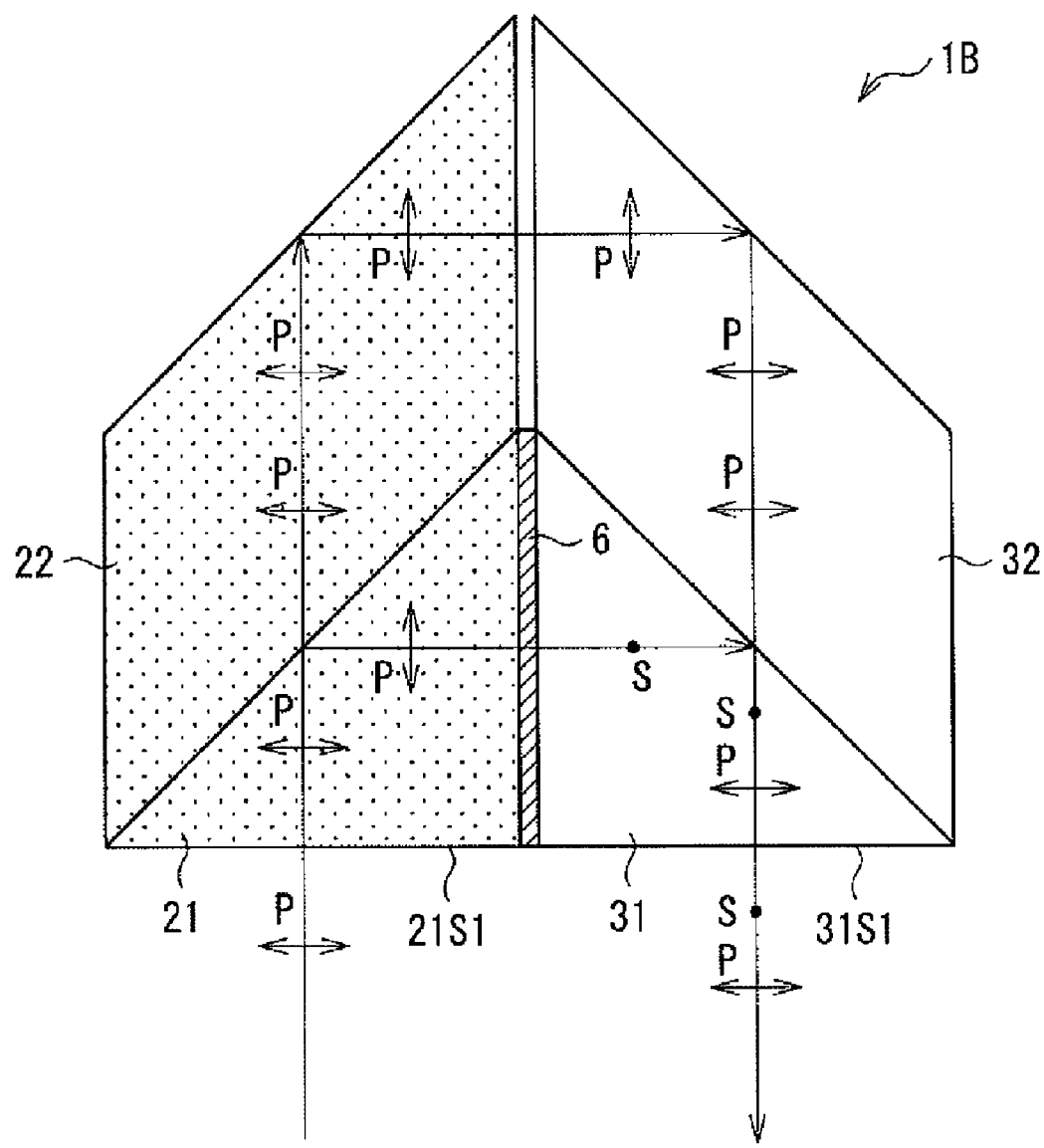

[Fig. 10A]
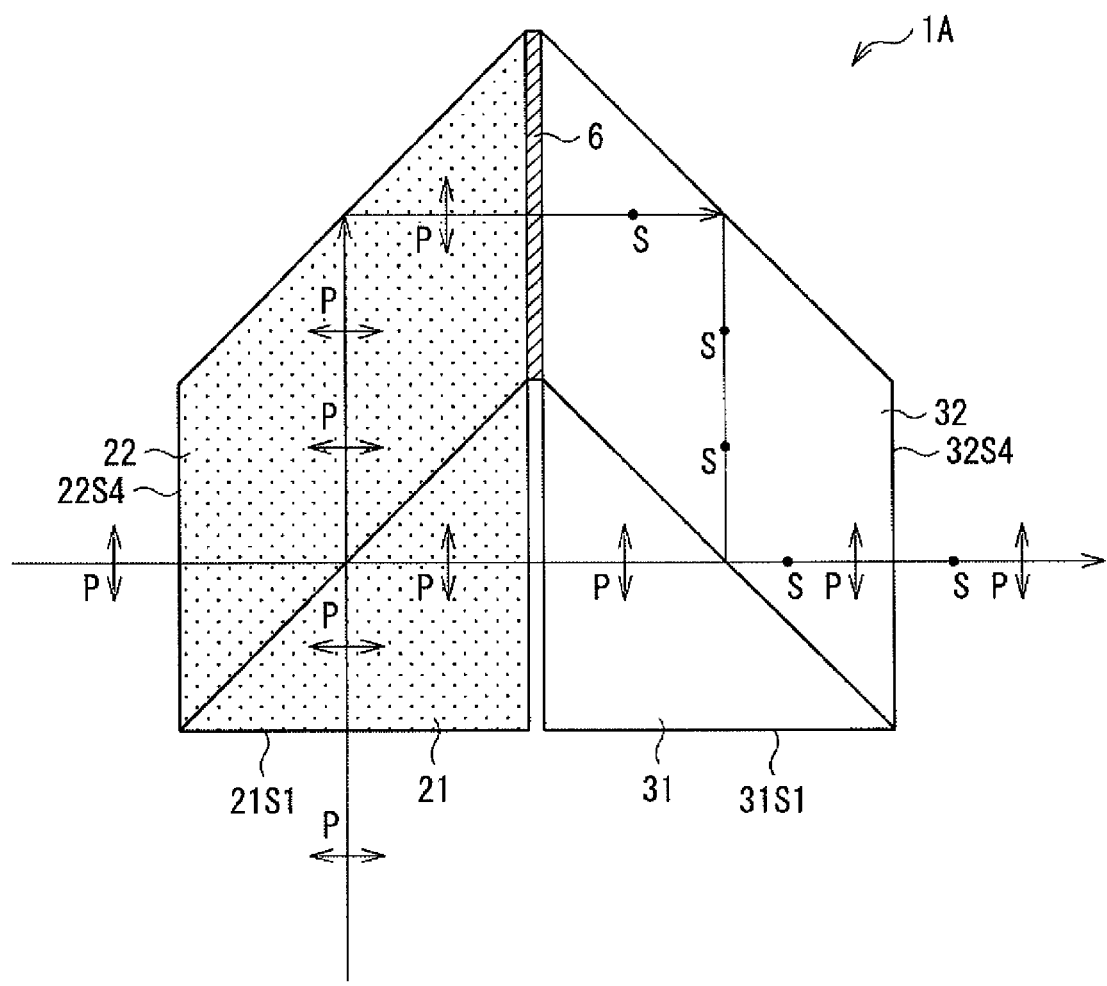

[Fig. 10B]
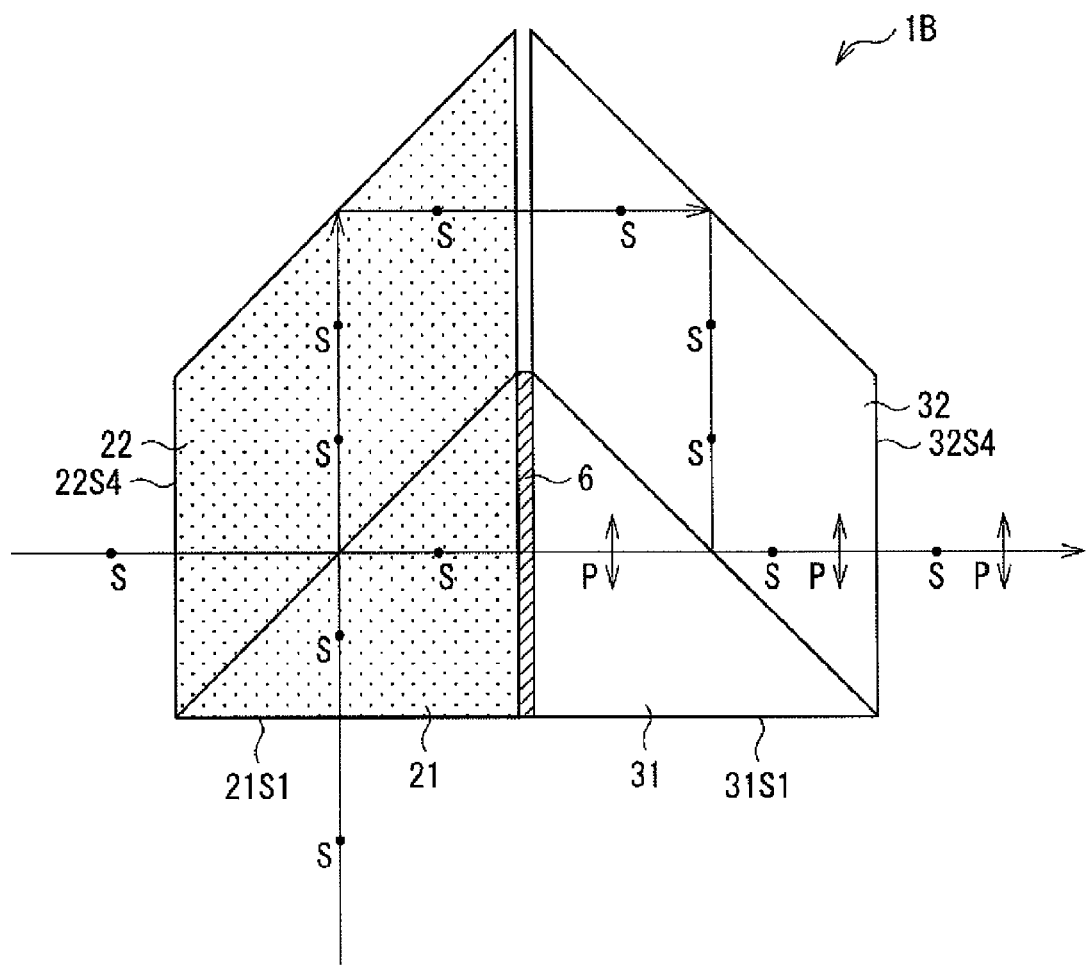

[Fig. 11A]
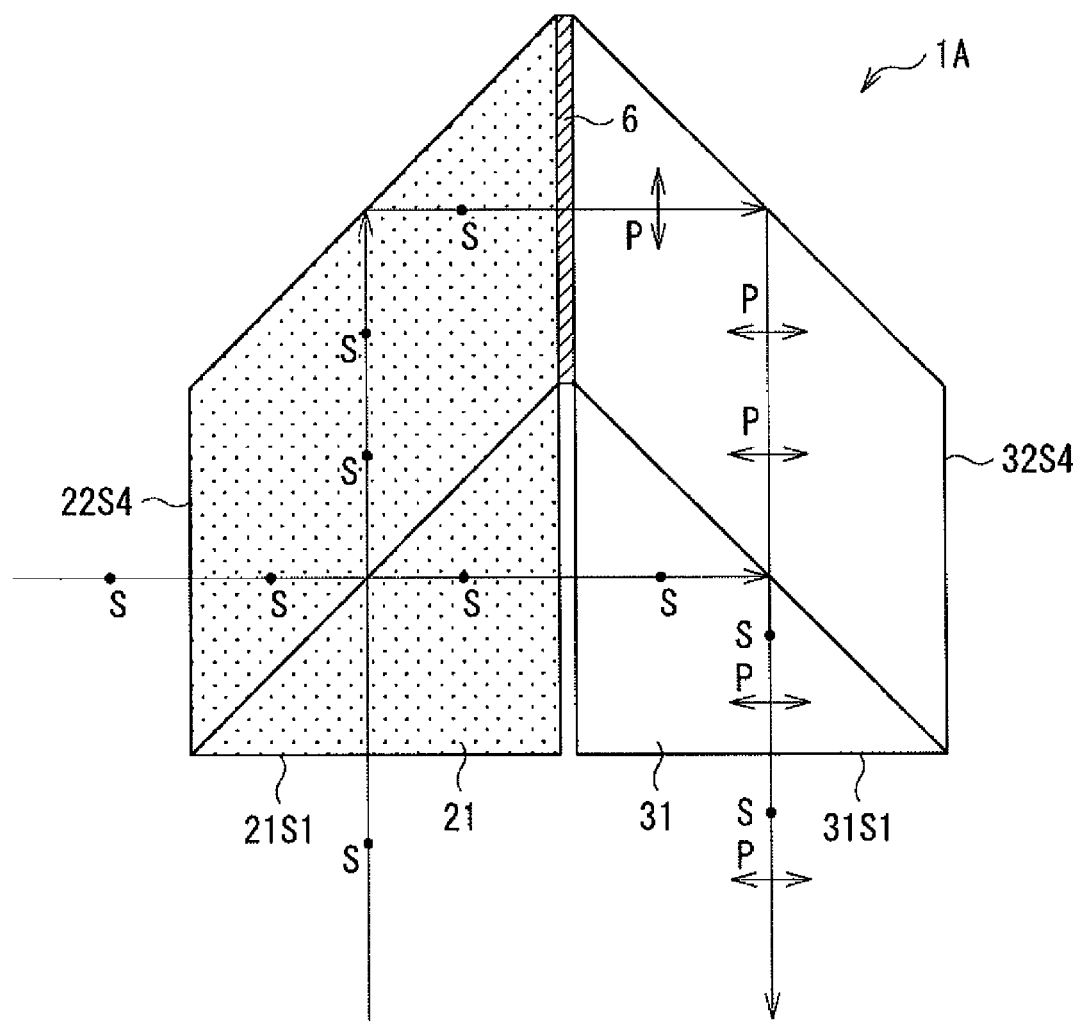

[Fig. 11B]
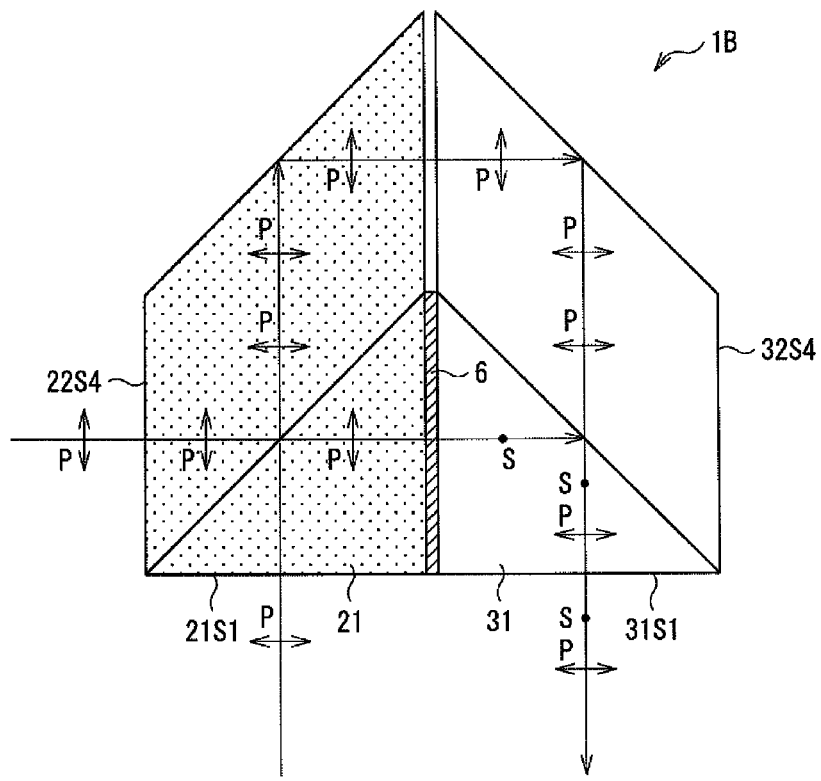
[Fig. 12]
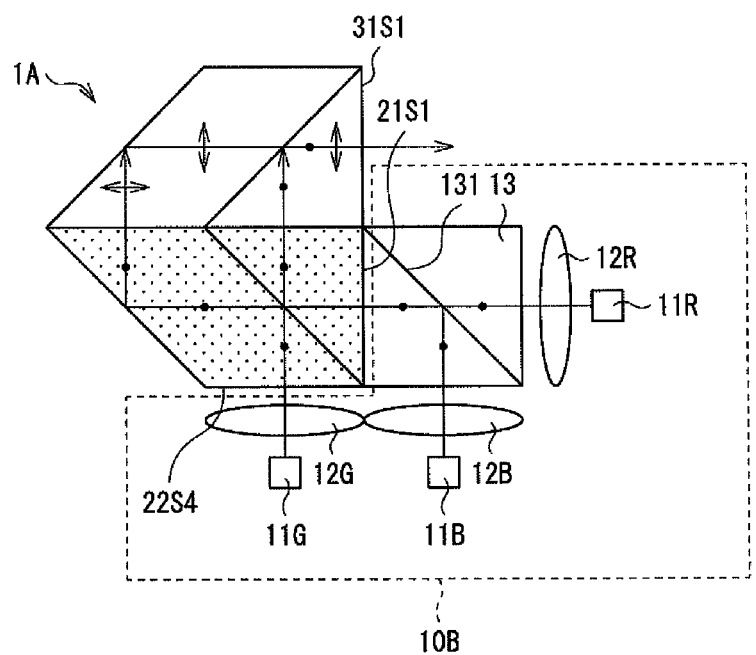

[Fig. 13]
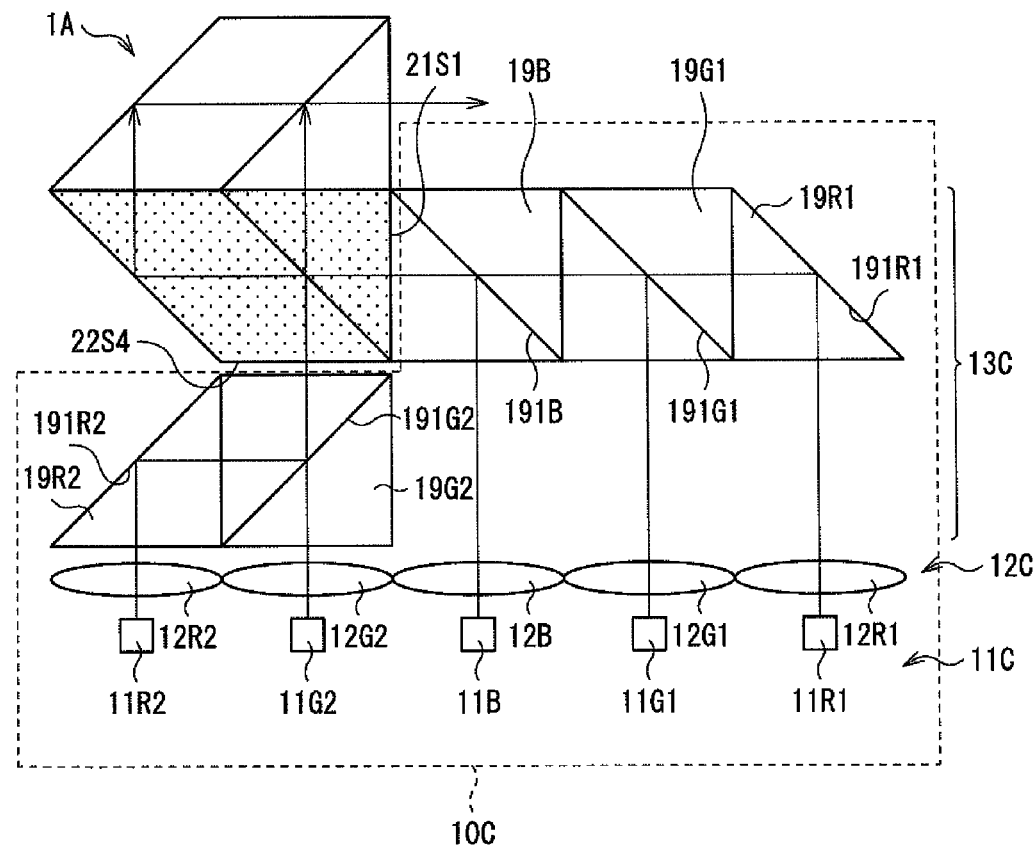
[Fig. 14A]
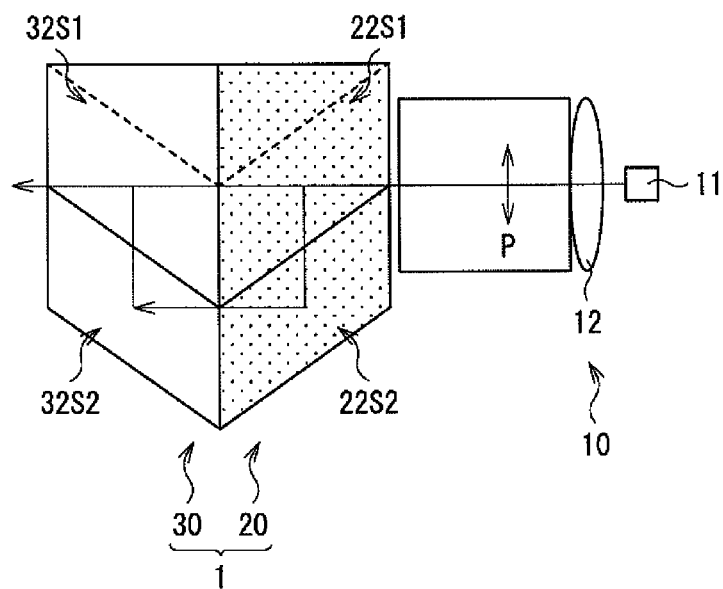

[Fig. 14B]
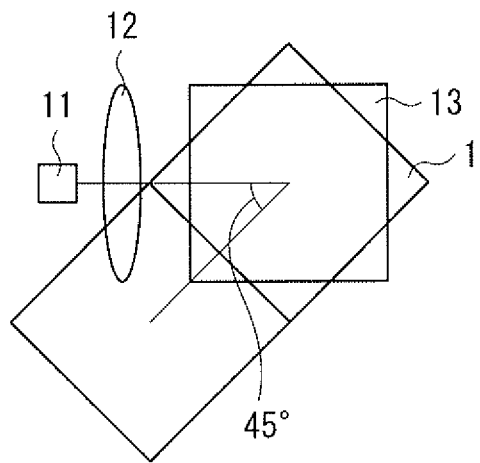
[Fig. 15A]
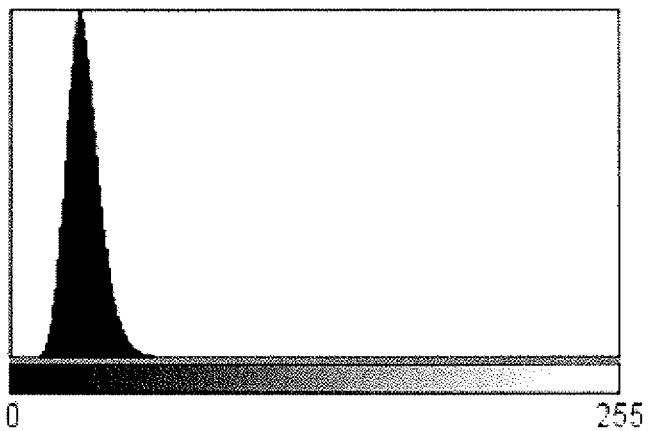
[Fig. 15B]
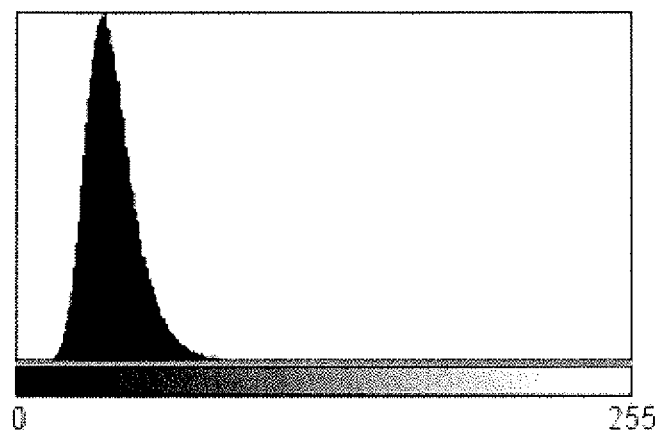

[Fig. 16]
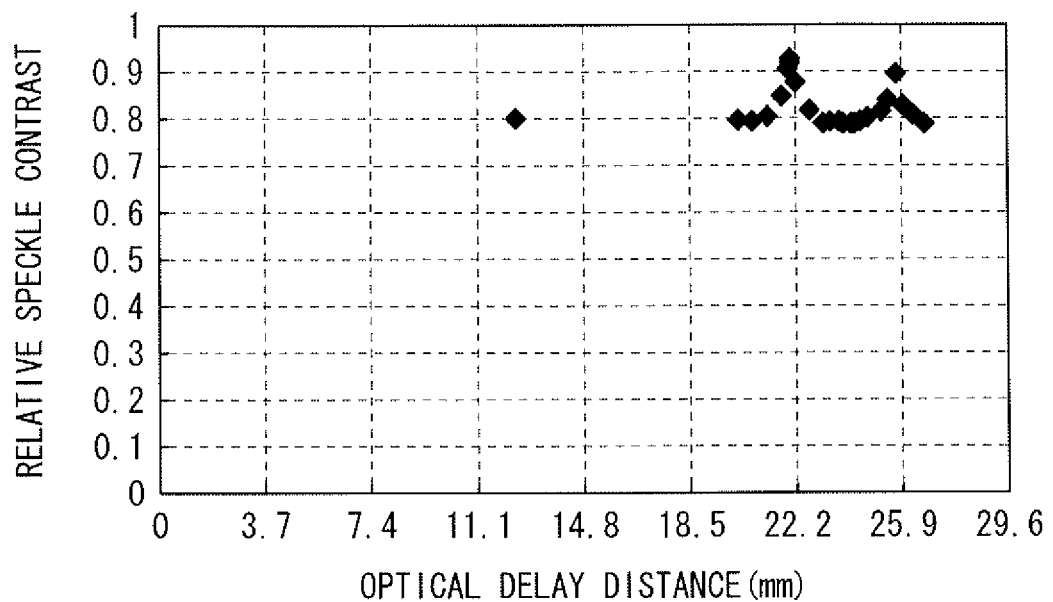
[Fig. 17A]
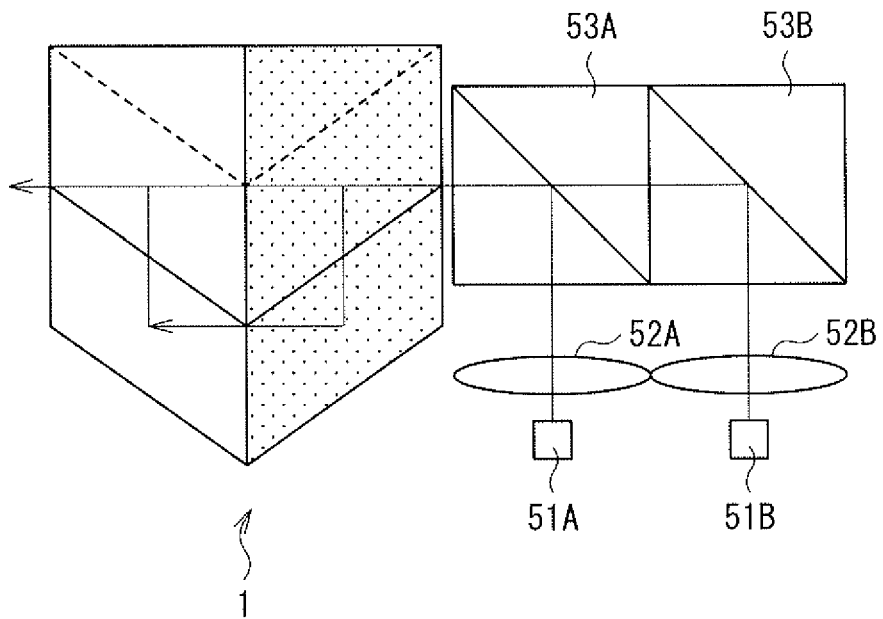

[Fig. 17B]
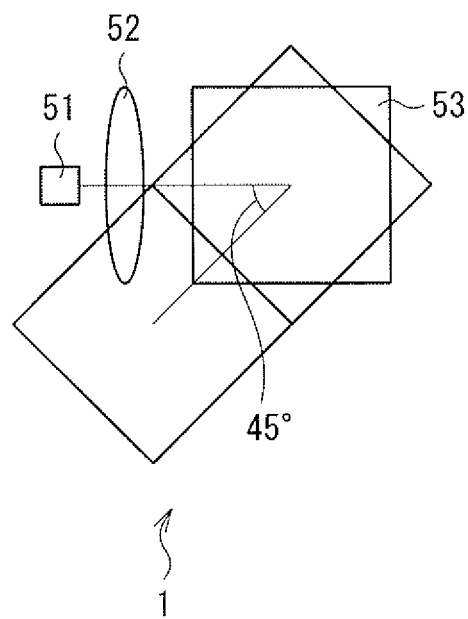

[Fig. 18]
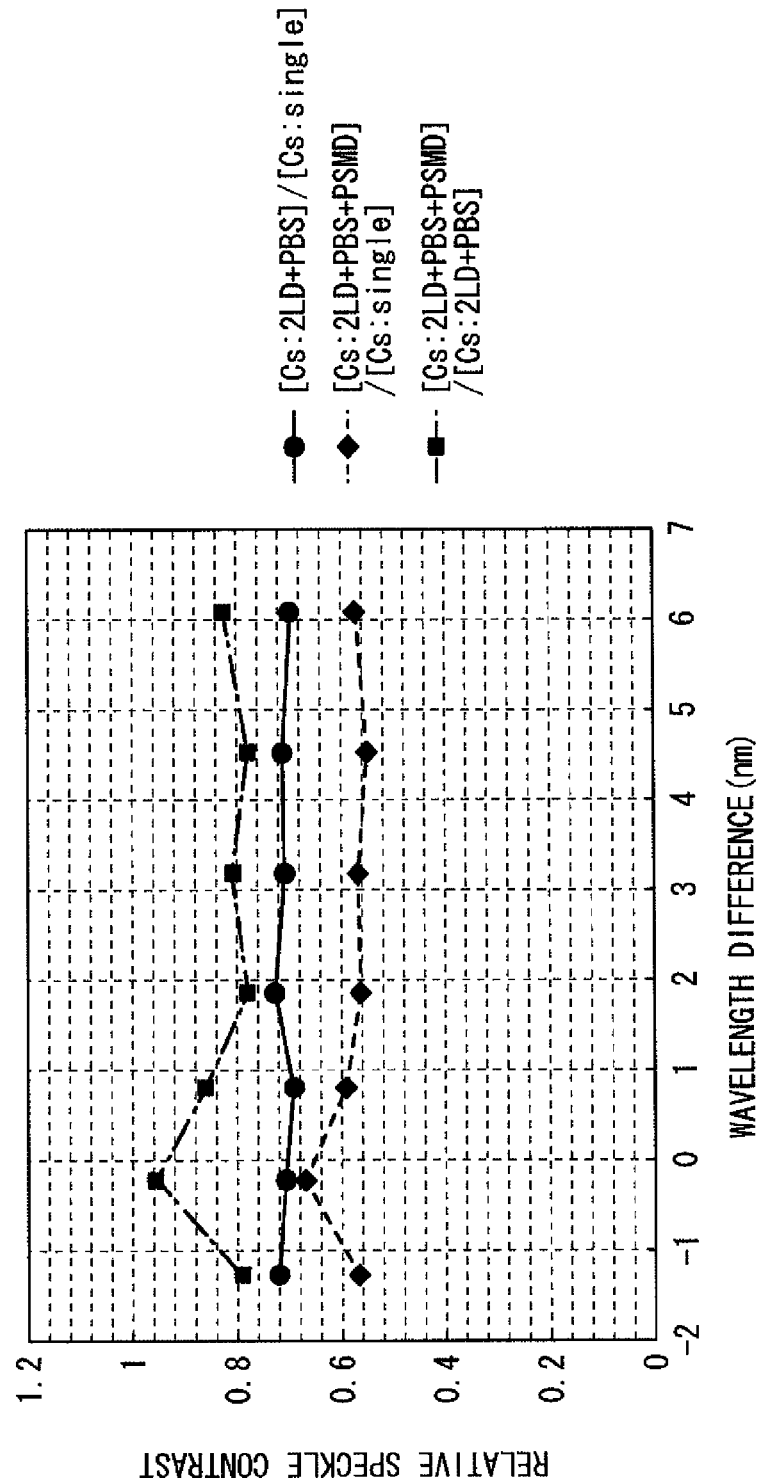

POLARIZATION SPLITTING MULTIPLEXING DEVICE, OPTICAL SYSTEM, AND DISPLAY UNIT

CROSS REFERENCES TO RELATED APPLICATIONS

The present application is a national stage of International Application No. PCT/JP2013/006332 filed on Oct. 25, 2013 and claims priority to Japanese Patent Application No. 2012-242836 filed on Nov. 2, 2012, the disclosure of which is incorporated herein by reference.

BACKGROUND

The present disclosure relates to a display unit performing picture display using, for example, a laser beam, and a polarization splitting multiplexing device and an optical system that are applied to such a display unit.

In recent years, as a light source of an illumination optical system in a projector (a projection type display unit), a laser attracts attention instead of a light emitting diode (LED). This is because using the laser as a light source expands color reproduction range, and contributes to achievement of low power consumption.

However, the laser is coherent light, and therefore if the laser is irradiated to a diffusing surface, spotty interference pattern is likely to be observed. Such interference pattern is called speckle pattern that is caused by the fact that light diffused by the diffusing surface interferes due to microscopic irregularity of the diffusing surface, resulting in decline in picture quality. Therefore, it is desirable to make the speckle pattern as less visible as possible.

To solve such a disadvantage, for example, there has been reported a method in which one laser beam is split into two polarized beams, and then multiplexing is performed so that one polarized beam has optical path delay with respect to the other polarized beam to reduce speckle (for example, see PTL 1 and PTL 2). In PTL 1, there is reported a method in which a laser beam is split into a P-polarized light beam and an S-polarized light beam by a first polarization beam splitter, and then the S-polarized light beam is multiplexed with the P-polarized light beam by a second polarization beam splitter through a folding prism. In addition, in PTL 2, there is reported a method in which a laser beam is split into a P-polarized light beam and an S-polarized light beam by a polarization beam splitter, and then these polarized light beams are reflected by a mirror toward the polarization beam splitter, and further the S-polarized light beam and the P-polarized light beam are multiplexed by a quarter-wavelength plate provided between the polarization beam splitter and the mirror. In PTL 1 and PTL 2, speckle is reduced by setting an optical delay distance between the P-polarized light beam and the S-polarized light beam to a coherence length or more. In addition, there is reported a method of splitting a laser beam with use of a half mirror (for example, see PTL 3).

CITATION LIST

Patent Literature

[PTL 1] Japanese Unexamined Patent Application Publication No. 2001-296503
[PTL 2] Japanese Unexamined Patent Application Publication No. 2010-191173
[PTL 3] Japanese Unexamined Patent Application Publication No. Sho 63-73221

SUMMARY

Technical Problem

In recent years, however, resolution enhancement in a laser beam scanning (LBS) projector using a laser light source is progressing. Here, in the case where it is assumed that a light collected position of a laser beam is a laser scanning pivot, for example, when a horizontal crosstalk of a pixel is assumed to be 50% at horizontal resolution of 1280 and a horizontal optical oscillation angle of 50 degrees, a divergence angle (full size) of a laser beam becomes 1 milliradian (mrad). Alternatively, when horizontal crosstalk of a pixel is revised to 100% at a horizontal resolution of 1900 and an optical oscillation angle of 80 degrees, the divergence angle (full size) of the laser beam becomes 1 milliradian. In other words, in the LBS projector, angle accuracy of a multiplexed beam is important.

In the LBS projector, performing direct current modulation on a semiconductor laser provides brightness corresponding to each pixel. If the laser beams are independent, picture blur is allowed to be suppressed by applying a current in light of positional deviation of the laser beams projected on a screen. However, in the above-described method of splitting one beam and then performing multiplexing, picture blur corresponding to positional deviation occurs. The angle deviation of the optical system of 1 milliradian corresponds to blur of one pixel, thereby decreasing resolution by half. If deviation of about 30% is tolerated, the deviation is 0.3 milliradian, and in the method of PTL1 or PTL3 described above, it corresponds to 0.15 milliradian in rotation accuracy of a second polarization beam splitter, and about 30 seconds. It is remarkably difficult to achieve 30 seconds in mounting accuracy of two optical components, and it is also difficult to stably maintain the above-described figure with respect to temperature change in environment. Moreover, in the method of PTL 2 described above, the mirror may be provided on each surface of the square-shaped polarization beam splitter, however, falling process accuracy is normally about 1 milliradian. Therefore, it is extremely difficult to achieve rotation accuracy of about 0.15 milliradian described above, and it is disadvantageous in terms of cost.

It is desirable to provide a display unit capable of reducing speckle and exerting more favorable picture display performance with a simple configuration, and a polarization splitting multiplexing device and an optical system that are mounted on the display unit.

Solution to Problem

In an embodiment, an optical system is provided comprising a light source configured to emit a light; and a polarizing splitting multiplexing device including a first prism configured to split the light into two polarized light beams having different optical path lengths, and a second prism configured to combine the two polarized light beams. The first prism includes a first reflective surface and a first polarization splitting surface facing the first reflective surface, and the second prism includes a second reflective surface and a second polarization splitting surface facing the second reflective surface.

In another embodiment of the optical system, at least one of the first prism and the second prism includes a transparent plate having a front surface and a back surface that are flat and substantially parallel to each other.

In another embodiment of the optical system, each of the first polarization splitting surface and the second polarization splitting surface has a reflective film including at least one of a metal film and a dielectric film. In another embodiment of the optical system, each of the first reflective surface and the second reflective surface has a polarization splitting film including at least one of a dielectric film and a wire grid.

In another embodiment of the optical system, the polarizing splitting multiplexing device includes a first triangular prism facing the first polarization splitting surface and a second triangular prism facing the second polarization splitting surface. In another embodiment of the optical system, a first polarized light beam has an optical path through the first prism and the second prism, and a second polarized light beam has an optical path through the first triangular prism and the second triangular prism.

In another embodiment of the optical system, the optical system is a projector. In another embodiment of the optical system, the light source is a laser light source. In another embodiment of the optical system, the first prism is adjacent to the second prism.

In an embodiment, a polarizing splitting multiplexing device is provided comprising a first prism configured to split a light into two polarized light beams having different optical path lengths, wherein the first prism includes a first reflective surface and a first polarization splitting surface facing the first reflective surface; and a second prism configured to combine the two polarized light beams, wherein the second prism includes a second reflective surface and a second polarization splitting surface facing the second reflective surface.

In another embodiment of the polarizing splitting multiplexing device, at least one of the first prism and the second prism includes a transparent plate having a front surface and a back surface that are flat and substantially parallel to each other. In another embodiment of the polarizing splitting multiplexing device, each of the first polarization splitting surface and the second polarization splitting surface has a reflective film including at least one a dielectric multilayer film and a combination of a metal film and a dielectric film. In another embodiment of the polarizing splitting multiplexing device, each of the first reflective surface and the second reflective surface has a polarization splitting film including at least one of a dielectric multilayer film and a wire grid.

In another embodiment of the polarizing splitting multiplexing device, the polarizing splitting multiplexing device further comprises a first triangular prism facing the first polarization splitting surface; and a second triangular prism facing the second polarization splitting surface. In another embodiment of the polarizing splitting multiplexing device, a first polarized light beam has an optical path through the first prism and the second prism, and a second polarized light beam has an optical path through the first triangular prism and the second triangular prism. In another embodiment of the polarizing splitting multiplexing device, wherein the first prism is adjacent to the second prism.

In another embodiment, a display unit is provided comprising a light source configured to emit a light; and a polarizing splitting multiplexing device including a first prism configured to split the light into two polarized light beams having different optical path lengths, and a second prism configured to combine the two polarized light beams. The first prism includes a first reflective surface and a first polarization splitting surface facing the first reflective surface, and the second prism includes a second reflective surface and a second polarization splitting surface facing the second reflective surface.

Advantageous Effects of Invention

According to the polarization splitting multiplexing device, the optical system, and the display unit according to the respective embodiments of the disclosure, it is possible to improve accuracy of mutual inclination between (the first and second) reflective surfaces, the non-polarization splitting surface, and (the first and second) polarization splitting surfaces, and to obtain desired optical delay between P-polarized light beam and S-polarized light beam, with a simple configuration. Consequently, it is suitable for reducing speckle without increasing the size of the unit, and for exerting more favorable picture display performance.

It is to be understood that both the foregoing general description and the following detailed description are exemplary, and are provided to provide further explanation of the technology as claimed.

Additional features and advantages are described herein, and will be apparent from the following Detailed Description and figures.

BRIEF DESCRIPTION OF THE FIGURES

The accompanying drawings are included to provide a further understanding of the technology, and are incorporated in and constitute a part of this specification. The drawings illustrate embodiments and, together with the specification, serve to explain the principles of the technology.

FIG. 1A is a diagram illustrating an overall configuration of a display unit according to a first embodiment of the technology.

FIG. 1B is a diagram illustrating an overall configuration of a modification of the display unit illustrated in FIG. 1A (modification 1-1).

FIG. 2A is a diagram illustrating a configuration example of an optical system illustrated in FIGS. 1A and 1B.

FIG. 2B is a diagram illustrating positional relationship between optical elements and a light source section, in the optical system illustrated in FIGS. 1A and 1B.

FIG. 3 is a diagram illustrating a configuration example of a polarization splitting multiplexing device illustrated in FIGS. 1A and 1B and a function thereof.

FIG. 4 is a diagram illustrating another optical path in the polarization splitting multiplexing device illustrated in FIGS. 1A and 1B (modification 1-1).

FIG. 5 is a diagram illustrating a configuration example of an optical system as a modification applied to the display unit illustrated in FIGS. 1A and 1B (modification 1-2).

FIG. 6A is a diagram illustrating a configuration example of a polarization splitting multiplexing device according to a second embodiment of the technology, and illustrating a first optical path passing through the polarization splitting multiplexing device.

FIG. 6B is a diagram illustrating a configuration example of a polarization splitting multiplexing device as a modification according to the second embodiment of the technology, and illustrating a first optical path passing through the polarization splitting multiplexing device (modification 2-1).

FIG. 7A is a diagram illustrating a second optical path in the polarization splitting multiplexing device illustrated in FIG. 6A (modification 2-2).

FIG. 7B is a diagram illustrating a second optical path in the polarization splitting multiplexing device as the modification illustrated in FIG. 6B (modification 2-3).

FIG. 8A is a diagram illustrating a third optical path in the polarization splitting multiplexing device illustrated in FIG. 6A (modification 2-4).

FIG. 8B is a diagram illustrating a third optical path in the polarization splitting multiplexing device as the modification illustrated in FIG. 6B (modification 2-5).

FIG. 9A is a diagram illustrating a fourth optical path in the polarization splitting multiplexing device illustrated in FIG. 6A (modification 2-6).

FIG. 9B is a diagram illustrating a fourth optical path in the polarization splitting multiplexing device as the modification illustrated in FIG. 6B (modification 2-7).

FIG. 10A is a diagram illustrating a fifth optical path in the polarization splitting multiplexing device illustrated in FIG. 6A (modification 2-8).

FIG. 10B is a diagram illustrating a fifth optical path in the polarization splitting multiplexing device as the modification illustrated in FIG. 6B (modification 2-9).

FIG. 11A is a diagram illustrating a sixth optical path in the polarization splitting multiplexing device illustrated in FIG. 6A (modification 2-10).

FIG. 11B is a diagram illustrating a sixth optical path in the polarization splitting multiplexing device as the modification illustrated in FIG. 6B (modification 2-11).

FIG. 12 is a diagram illustrating a configuration example of an optical system using the polarization splitting multiplexing device illustrated in FIGS. 6A and 6B.

FIG. 13 is a diagram illustrating a first modification of the optical system using the polarization splitting multiplexing device illustrated in FIGS. 6A and 6B (modification 2-12).

FIG. 14A is a schematic configuration diagram of an optical system used in Experimental Example 1-1.

FIG. 14B is another schematic configuration diagram of the optical system used in Experimental Example 1-1.

FIG. 15A is a characteristic diagram illustrating brightness distribution of an image projected on a screen in Experimental Example 1-1.

FIG. 15B is a characteristic diagram illustrating brightness distribution of an image projected on a screen in Experimental Example 1-2.

FIG. 16 is a characteristic diagram illustrating relationship between an optical delay distance and relative speckle contrast in Experimental Example 2.

FIG. 17A is a schematic configuration diagram of an optical system used in Experimental Example 3.

FIG. 17B is another schematic configuration diagram of the optical system used in Experimental Example 3.

FIG. 18 is a characteristic diagram illustrating relationship between a wavelength difference of two laser beams and relative speckle contrast in Experimental Example 3.

DETAILED DESCRIPTION

<First Embodiment>

Hereinafter, a first embodiment of the disclosure will be described in detail with reference to drawings.

(Display Unit)

FIG. 1A illustrates a display unit of the first embodiment. For example, the display unit may be a laser beam scanning projector using a semiconductor laser as a light source. As illustrated in FIG. 1A, the display unit includes a light source section 10, a polarization splitting multiplexing device 1 allowing a laser beam from the light source section 10 to pass therethrough, and a micro electro mechanical system (MEMS) mirror 14 as a scanning section. Further, as illustrated in FIG. 1B, the display unit may include a quarter-wavelength plate 15 on an optical path between the polarization splitting multiplexing device 1 and the light source section 10.

(Optical System)

FIG. 2A illustrates an optical system in the display unit illustrated in FIG. 1A. For example, the optical system may include the light source section 10 and the polarization splitting multiplexing device 1. The light source section 10 includes a laser light source 11, a collimating section 12, and a color multiplexing section 13. The laser light source 11 includes a red laser 11R, a green laser 11G, and a blue laser 11B, and the collimating section 12 includes collimator lenses 12R, 12G, and 12B. The color multiplexing section 13 includes a reflective mirror 13R and dichroic prisms 13G and 13B.

The red laser 11R, the green laser 11G, and the blue laser 11B are three kinds of light sources emitting a red laser beam, a green laser beam, and a blue laser beam, respectively. For example, each of the red laser 11R, the green laser 11G, and the blue laser 11B may be formed of a semiconductor laser or the like. Alternatively, each of the red laser 11R, the green laser 11G, and the blue laser 11B may be formed of a super luminescent diode. The laser light source 11 may include two or more red lasers 11R, two or more green lasers 11G, and two or more blue lasers 11B. In this case, desirably, the two or more red lasers 11R, the two or more green lasers 11G, and the two or more blue lasers 11B may emit respective laser beams of the same color having respective peak wavelengths different from one another by about 1 nanometer or more, and the emitted laser beams may enter the polarization splitting multiplexing device 1.

The collimator lenses 12R, 12G, and 12B collimate a red laser beam emitted from the red laser 11R, a green laser beam emitted from the green laser 11G, and a blue laser beam emitted from the blue laser 11B, respectively, into substantially parallel beams. The substantially parallel beam described herein is a beam slightly diffused as compared with immediately after being collimated. In other words, it indicates a beam slightly defocused, a beam that is parallel beam immediately after being collimated and is gradually diffused due to diffraction of coherence light, or a beam that is slightly collected immediately after being collimated and passes through the collimator lenses 12R, 12G, and 12B to be collected at a position distanced from the collimator lenses 12R, 12G, and 12B by several tens centimeters to several meters, and then is diffused. The technology exerts beneficial effects when substantially parallel beam is used. Note that, in the following description, "substantially parallel beam" is simply referred to as parallel beam.

The reflective mirror 13R has a reflective surface 131R. The reflective surface 131R reflects the red laser beam that has been emitted from the red laser 11R, and then has passed through the collimator lens 12R to be collimated into a parallel beam, toward the dichroic prism 13B. The dichroic prism 13B is a prism having a dichroic film 131B. The dichroic film 131B reflects the blue laser beam that has been emitted from the blue laser 11B and has been collimated by the collimator lens 12B into parallel beam, while allowing the red laser beam from the reflective mirror 13R to selectively pass therethrough. The dichroic prism 13G is a prism having a dichroic film 131G. The dichroic film 131G selectively reflects the green laser beam that has been emitted from the green laser 11G and has been collimated by the collimator lens 12G into parallel beam, while allowing the blue laser beam and the red laser beam from the dichroic prism 13B to selectively pass therethrough. As a result, color multiplexing (optical path multiplexing) of the red laser beam, the green laser beam, and the blue laser beam is performed.

The MEMS mirror 14 reflects a laser beam that has passed through the polarization splitting multiplexing device 1, and scans a screen 17, for example. As the MEMS mirror, a mirror of two-dimensional system including a low speed perpendicular gimbal and a high speed horizontal gimbal, or a mirror of one-dimensional system including a combination of a low speed perpendicular mirror and a high speed horizontal mirror may be employed. Incidentally, the MEMS mirror 14 is not limited thereto.

The polarization splitting multiplexing device 1 is disposed between the light source section 10 and the MEMS mirror 14 described above (in this case, on an optical path between the dichroic prism 13G and the MEMS mirror 14). The red laser 11R, the green laser 11G, and the blue laser 11B each use linear polarization such as TE polarization (P polarization parallel to the paper plane of FIG. 2A) and TM polarization (S polarization vertical to the paper plane of FIG. 2B). As illustrated in FIG. 2B, the polarization splitting multiplexing device 1 is desirably inclined by an angle Q (in this case, Q=45 degrees) with respect to the light source section 10 with an optical axis serving as a central axis in the XY plane. This is to generate two polarized light beams orthogonal to each other by the polarization splitting multiplexing device 1 from a laser beam emitted from each of the red laser 11R, the green laser 11G, and the blue laser 11B. Specifically, in the case of being projected on the XY plane, a traveling direction of the laser beam of each color in the light source section 10 and a traveling direction of the laser beam of each color inside the polarization splitting multiplexing device 1 may preferably make the angle Q (in this case, Q=45 degrees). As a result, the polarization direction of the laser beam before and after passing through the polarization splitting multiplexing device 1 is inclined by the angle Q (in this case, Q=45 degrees). The polarization splitting multiplexing device 1 is to reduce speckle noise (interference pattern) described later, as well as to generate two polarized light beams orthogonal to each other from the incident laser beam and to form optical path delay between the two polarized light beams. Incidentally, in the case where the quarter-wavelength plate 15 is disposed on the optical path between the polarization splitting multiplexing device 1 and the light source section 10, the laser beam emitted from each of the red laser 11R, the green laser 11G, and the blue laser 11B enters the polarization splitting multiplexing device 1 after being converted into a right-handed circularly polarized light beam or a left-handed circularly polarized light beam. Therefore, setting the above-described angle Q to 0 degree or 180 degrees allows generation of the two polarized light beams orthogonal to each other by the polarization splitting multiplexing device 1.

(Configuration of Polarization Splitting Multiplexing Device)

Subsequently, the detailed configuration of the polarization splitting multiplexing device 1 will be described with reference to FIG. 3 in addition to FIGS. 2A and 2B. FIG. 3 illustrates a detailed configuration example of the polarization splitting multiplexing device 1 illustrated in FIGS. 1A and 1B.

The polarization splitting multiplexing device 1 splits the laser beam of each color from the slight source section 10 into the P-polarized light beam and the S-polarized light beam to generate an optical path difference therebetween, and multiplexes the P-polarized light beam and the S-polarized light beam to emit the multiplexed light beam. The polarization of the laser beam entering the polarization splitting multiplexing device 1 is linear polarization at Q=45 degrees or −45 degrees, or a right-handed circular polarization or a left-handed circular polarization. Note that, in FIG. 3, the case of linear polarization (S polarization) is illustrated. The polarization splitting multiplexing device 1 includes a pair of optical elements 20 and 30.

The optical element 20 includes a triangular prism 21 and a parallel prism 22. In the parallel prism 22, a polarization splitting film 2L is formed on a surface 22S1 facing an inclined surface of the triangular prism 21. Moreover, in the parallel prism 22, a reflective film 3L is formed on a surface 22S2 on a side opposite to the surface 22S1. Therefore, the optical element 20 has a polarization splitting surface (the surface 22S1) and a reflective surface (the surface 22S2) that face each other. The surface 22S1 and the surface 22S2 may be desirably substantially parallel to each other. In addition, the parallel prism 22 may be preferably cut out from one transparent plate having a front surface and a back surface that are flat and are substantially parallel to each other. This is because the parallel prism 22 including the surface 22S1 and the surface 22S2 with high degree of parallelism is obtainable more conveniently. As the transparent plate, a plate formed of $SiO_2$ or other optical glass, or a plate formed of a transparent resin is employed. In addition, the term "transparent" used herein is not limited to transparency to visible light, and includes transparency to infrared light, for example.

The optical element 30 includes a triangular prism 31 and a parallel prism 32. In the parallel prism 32, a polarization splitting film 2R is formed on a surface 32S1 facing an inclined surface of the triangular prism 31. In addition, in the parallel prism 32, a reflective film 3R is formed on a surface 32S2 on a side opposite to the surface 32S1. Therefore, the optical element 30 includes a polarization splitting surface (the surface 32S1) and a reflective surface (the surface 32S2) that face each other. The surface 32S1 and the surface 32S2 may also be desirably substantially parallel to each other. Moreover, the parallel prism 32 may be preferably cut out from one transparent plate having a front surface and a back surface that are flat and are substantially parallel to each other, for the reason same as that of the above-described parallel prism 22.

The parallel prism 22 includes an end surface 22S3 connecting the surface 22S1 and the surface 22S2, and the parallel prism 32 includes an end surface 32S3 connecting the surface 32S1 and the surface 32S2. The parallel prism 22 and the parallel prism 32 are disposed adjacent to each other so that the end surface 22S3 and the end surface 32S3 face each other. Likewise, the triangular prism 21 and the triangular prism 31 are disposed adjacent to each other so that a surface 21S2 and a surface 31S2, which are not inclined surfaces, face each other. In this case, the end surface 22S3 and the end surface 32S3 may be in contact with each other, or may be away from each other. Alternatively, the end surface 22S3 and the end surface 32S3 may be bonded to each other. The same applies to the relationship between the surface 21S2 and the surface 31S2.

In addition, the end surface 22S3 and the end surface 32S3 may be desirably substantially parallel to each other, and an angle Q22 formed by the end surface 22S3 and the surface 22S2 may be desirably substantially equal to an angle Q32 formed by the end surface 22S3 and the surface 32S2. Each of the angles Q22 and Q32 may be preferably, for example, 45 degrees.

Each of the reflective films 3L and 3R may be formed of, for example, a dielectric multilayer film. Note that, when the incident laser beam is totally reflected by the surfaces 22S2 and 32S2, the reflective films 3L and 3R may be not provided. In addition, each of the reflective films 3L and 3R may be formed of a metal film having high reflectance. Further, each of the reflective films 3L and 3R may be formed of a combination of a metal film and a dielectric film (or a dielectric multilayer film). In the embodiment of the technology, the configuration of the reflective films 3L and 3R is not limited thereto, and other configuration may be employed.

Each of the polarization splitting films 2L and 2R may be formed of, for example, a dielectric multilayer film, and has a function of allowing the P-polarized light beam (a linear polarized light beam having a polarization direction parallel to a surface including a normal of each of the polarization splitting films 2L and 2R and the incident light beam) of the incident laser beam to pass therethrough, and reflecting the S-polarized light beam (a linear polarized light beam having a polarization direction orthogonal to the polarization direction of the P-polarized light beam). In addition, each of the polarization splitting films 2L and 2R may be formed of a wire grid. In the embodiment of the technology, the configuration of the polarization splitting films 2L and 2R is not limited thereto, and other configuration may be employed.

The surface 22S2 that is a reflective surface of the optical element 20 reflects the laser beam from the surface 22S1 that is a polarization splitting surface, toward the surface 32S2 that is a reflective surface of the optical element 30. The surface 32S2 reflects the laser beam from the surface 22S2 toward the surface 32S1 that is a polarization splitting surface of the optical element 30.

(Function and Effects of Display Unit)

(1. Display Operation)

In the display unit, first, beams (laser beams) emitted from the red laser 11R, the green laser 11G, and the blue laser 11B are collimated by the collimator lenses 12R, 12G, and 12B, respectively, into parallel beams. Then, the laser beams converted into the parallel beams in this way are multiplexed (subjected to optical path multiplexing) by the color multiplexing section 13 (the reflective mirror 13R and the dichroic prisms 13G and 13B), and travels toward the polarization splitting multiplexing device 1. More specifically, the red laser beam emitted from the red laser 11R is reflected by the reflective surface 131R, and then sequentially passes through the dichroic film 131B and the dichroic film 131G and travels toward the polarization splitting multiplexing device 1. The blue laser beam emitted from the blue laser 11B is reflected by the dichroic film 131B and then passes through the dichroic film 131G, and travels toward the polarization splitting multiplexing device 1. The green laser beam emitted from the green laser 11G is reflected by the dichroic film 131G and then travels toward the polarization splitting multiplexing device 1. The laser beam multiplexed by the color multiplexing section 13 passes through the polarization splitting multiplexing device 1, and then enters the MEMS mirror 14. The laser beam reached the MEMS mirror 14 is reflected by the MEMS mirror 14, and is then projected on the screen 17. The MEMS mirror 14 scans the laser beam from the polarization splitting multiplexing device 1 to form a picture on the screen 17.

At this time, the red laser 11R, the green laser 11G, and the blue laser 11B sequentially generate light (perform pulse emission) in a time-divisional manner to emit the red laser beam, the green laser beam, and the blue laser beam, respectively. Then, based on a picture signal of each color component (a red component, a green component, and a blue component) supplied from outside, the red laser beam, the green laser beam, and the blue laser beam are individually and sequentially subjected to one or both of intensity modulation and a pulse width modulation in a time-divisional manner. In addition, the modulation based on the picture signals may be superimposed with a high frequency component. As a result, color picture display based on the picture signals is performed on the screen 17. Note that, in the intensity modulation, an injection current to each of the red laser 11R, the green laser 11G, and the blue laser 11B may be preferably modulated directly.

(2. Function of Polarization Splitting Multiplexing Device)

Next, a function of the polarization splitting multiplexing device 1 is described with reference to FIG. 3 mainly. The laser beam passed through the color multiplexing section 13 includes a linear polarized light beam of Q=+45 degrees or a linear polarized light beam of Q=−45 degrees (Q=+135 degrees) that is inclined by 45 degrees with respect to a surface (X'Z surface) including an optical path of the polarization splitting multiplexing device 1. The laser beam of the linear polarization (the laser beam of the S polarization polarized in, for example, Y-axis direction in FIG. 3) may enter the parallel prism 22 from an end surface 22S4 on a side opposite to the end surface 22S3, for example. After passing through the surface 22S4 and entering the parallel prism 22, the linear polarized light beam (S-polarized light beam) is split into the S-polarized light beam that has been reflected by the surface 22S1 and the P-polarized light beam that has passed through the surface 22S1. At this time, the polarization direction of the S-polarized light beam that has been reflected by the surface 22S1 is rotated by 45 degrees and becomes an YY-direction perpendicular to the paper plane. On the other hand, the polarization direction of the P-polarized light beam that has passed through the surface 22S1 is rotated by 45 degrees and becomes an XX-direction parallel to the paper plane. The S-polarized light beam that has been reflected by the surface 22S1 travels toward the surface 22S2. The S-polarized light beam is reflected by the surface 22S2, and then sequentially passes through the end surface 22S3 and the end surface 32S3, and enters the parallel prism 32. Further, the S-polarized light beam is sequentially reflected by the surface 32S2 and the surface 32S1, and is then emitted from the surface 32S4 to the outside. On the other hand, the P-polarized light beam that has passed through the surface 22S1 sequentially passes through the surface 21S2, the surface 31S2, and the surface 32S1 and travels in a straight line, and is then multiplexed with the S-polarized light beam to be emitted from the surface 32S4 to the outside. As a result, the S-polarized light beam is emitted from the polarization splitting multiplexing device 1 after following the optical path longer than that of the P-polarized light beam. In other words, an optical delay distance (an optical path length difference) D is allowed to be generated between the S-polarized light beam and the P-polarized light beam. At this time, on the surface 32S1, a position where the S-polarized light beam is reflected and a position where the P-polarized light beam passes, namely, an emission position of the S-polarized light beam and an emission position of the P-polarized light beam may be desirably substantially coincident with each other. This is to reduce speckle sufficiently. Note that the XX-direction and the YY-direction are directions obtained by rotating the X-axis and the Y-axis, respectively, by 45 degrees around the Z-axis.

The optical delay distance D is a value obtained by multiplying an actual distance difference (an actual optical path difference) between the optical path of the P-polarized light beam and the optical path of the S-polarized light beam by an optical refractive index. The optical refractive index has a property slightly varied by dispersion depending on the wavelength of the laser beam, and therefore the optical delay distance D is inevitably slightly varied depending on the wavelength of the laser beam. For example, the following expression (1) may be desirably satisfied with respect to each of the red laser 11R, the green laser 11G, and the blue laser 11B of the laser light source 11. Incidentally, neff indicates an effective refractive index to the laser beam, L indicates a resonator length of each laser, and m indicates a natural number.

[Math. 1]

$$2*neff*L*(m+0.20) \leq D \leq 2*neff*L*(m+0.80) \tag{1}$$

The laser light source 11 includes a resonator, and coherency measured by Michelson interferometer has a large value at a pitch of $2*neff*L$ (=Lc(peak cycle)). Therefore, setting the optical delay distance D between the two split laser beams that are the laser beam of S polarization and the laser beam of P polarization, to be different from a peak position of the coherency allows suppression of coherence of the two laser beams. For example, when $2*neff*L$ of the red laser 11R, the green laser 11G, and the blue laser 11B are set to 8 millimeters, 2.77 millimeters, and 3.7 millimeters, respectively, the optical delay distance D may be set to, for example, 12.5 millimeters to the green laser 11G. Incidentally, the optical delay distance D becomes 12.398 millimeters to the red laser 11R and 12.733 millimeters to the blue laser 11B due to refractive index dispersion of the material, and the optical delay distance D corresponds to 1.55 times, 4.51 times, and 3.44 times of the above-described $2*neff*L=8$ mm, 2.77 mm, and 3.7 mm, respectively, and satisfies the above-described expression (1). When the two or more red lasers 11R, the two or more green lasers 11G, and the two or more blue lasers 11B are provided, the two or more lasers of the same color may preferably emit respective laser beams having respective peak wavelengths different from one another by about 1 nanometer or more. In other words, the two or more red lasers 11R may preferably emit red laser beams having peak wavelengths different from one another by about 1 nanometer or more, the two or more green lasers 11G may preferably emit green laser beams having peak wavelengths different from one another by about 1 nanometer or more, the two or more blue lasers 11B may preferably emit blue laser beams having peak wavelengths different from one another by about 1 nanometer or more.

(3. Effects)

In this way, in the first embodiment, an optical path difference with high accuracy is provided between the split S-polarized light beam and the split P-polarized light beam. Therefore, it is possible to sufficiently reduce speckle by polarization multiplexing. Since the flexibility of the polarization multiplexing is up to 2, in theory, when cross-correlation between the S-polarized light beam and the P-polarized light beam is set to 0 (zero), the speckle contrast is reduced to $\frac{1}{2}^{0.5}$ by the polarization multiplexing when the speckle contrast in the case where polarization and multiplexing are not performed is 1.

In addition, in the first embodiment, the parallel prism 22 that is an integrated component in the optical element 20 includes the polarization splitting surface (the surface 22S1) and the reflective surface (the surface 22S2) that face each other. Therefore, compared with the case where the polarization splitting surface and the reflective surface are provided on different objects and arranged, parallelism between the polarization splitting surface (the surface 22S1) and the reflective surface (the surface 22S2) is allowed to be significantly improved, and angle deviation therebetween is allowed to be extremely small (for example, about several arcseconds). The similar effects are obtainable in the optical element 30 for the similar reason. Therefore, the optical axis deviation between the emitted S-polarized light beam and the emitted P-polarized light becomes extremely small (for example, 0.3 milliradian or less). Consequently, the display unit sufficiently reduces speckle and exerts more favorable picture display performance with a simple and compact configuration.

Incidentally, in the first embodiment, the semiconductor laser may be desirably driven by high frequency superimposition, in addition to polarization multiplexing by the polarization splitting multiplexing device 1. In the wavelength range of red, green, and blue, frequency of about 100 MHz to about 500 MHz both inclusive is suitable. This suppresses gain concentration of the semiconductor laser and thus the spectrum width is about twice the spectrum width of the DC drive. Accordingly, speckle is allowed to be further reduced by the effect of wavelength multiplexing. Each semiconductor laser is synchronized with the MEMS mirror 14, and adjusts the intensity of the semiconductor laser and a duty ratio corresponding to each pixel. Therefore, for example, gray level with 8 bits may be achievable. A scan trajectory by the MEMS mirror 14 is curved, and thus the scan trajectory may be preferably corrected to a desired shape such as a rectangular shape by an optical system or signal processing. In the present circumstances, the resolution in the horizontal direction is desirably 1280 or more and the resolution in the vertical direction is desirably 720 or more, and the display unit according to the embodiment achieves a sufficient beam spot size. Moreover, the oscillation angle of the optical beam emitted from the MEMS mirror 14 may be desirably 45 degrees or more in the horizontal direction. To obtain such an oscillation angle, the oscillation angle of the MEMS mirror 14 may be increased, or an optical oscillation angle may be increased with use of a conversion lens.

(Modification 1-1)

The incident position of the laser beam to the polarization splitting multiplexing device 1 is not limited to that illustrated in FIG. 3, and may be that illustrated in FIG. 4, for example. FIG. 4 is a diagram illustrating another optical path of the laser beam that passes through the polarization splitting multiplexing device 1 illustrated in FIG. 1. Incidentally, in FIG. 4, illustration of the polarization splitting films 2L and 2R and the reflective films 3L and 3R is omitted. In FIG. 3, the laser beam of S polarization enters the polarization splitting multiplexing device 1 from the end surface 22S4 of the parallel prism 22 of the optical element 20, and the laser beam obtained by multiplexing the S-polarized light beam and the P-polarized light beam is emitted from the end surface 32S4 of the parallel prism 32 of the optical element 30. In contrast, in the present modification of FIG. 4, the laser beam of S polarization enters the polarization splitting multiplexing device 1 from a surface 21S1 of the triangular prism 21 of the optical element 20, and the laser beam obtained by multiplexing the S-polarized light beam and the P-polarized light beam is emitted from a surface 31S1 of the triangular prism 31 of the optical element 30.

Specifically, the polarization of the laser beam entering the polarization splitting multiplexing device 1 is a linear polarization of Q=45 degrees or −45 degrees or a right-handed circular polarization or a left-handed circular polarization. Note that in FIG. 4, the case where the linear polarized light beam (S-polarized light beam) polarized in the Y-axis direction enters is exemplified. The laser beam of S polarization enters the triangular prism 21 from the surface 21S1. The laser beam that has entered the triangular prism 21 is split into the S-polarized light beam that is reflected by the surface 22S1 and the P-polarized light beam that passes through the surface 22S1. The S-polarized light beam that has been reflected by the surface 22S1 passes through the end surface 21S2 and the end surface 31S2 sequentially, and then enters the triangular prism 31. After that, the S-polarized light beam is reflected by the surface 32S1 and is then emitted from the surface 31S1 to the outside. On the other hand, the P-polarized light beam that has passed through the surface 22S1 is reflected by the surface 22S2, then passes through the end surface 22S3 and the end surface 32S3 sequentially, and enters the parallel prism 32. Further, after being reflected by the surface 32S2, the P-polarized light beam passes through the surface 32S1 and travels in a straight line, and then is multiplexed with the S-polarized light beam to be emitted from the surface 31S1 to the outside. Accordingly, the P-polarized light beam is emitted from the polarization splitting multiplexing device 1 after following the optical path longer than that of the S-polarized light beam.

Even in the present modification in which the laser beam follows such a path, an optical path difference with high accuracy is allowed to be provided between the split S-polarized light beam and the split P-polarized light beam, and therefore it is possible to sufficiently reduce speckle by polarization multiplexing.

(Modification 1-2)

FIG. 5 is a configuration diagram illustrating an optical system as a second modification applied to the display unit of the first embodiment (modification 1-2). In the optical system of the present modification, the light source section 10 of the optical system of the above-described first embodiment (FIG. 2A) is replaced with a light source section 10A.

The light source section 10A includes a laser light source 11A, a collimating section 12A, and a color multiplexing section 13A. The laser light source 11A includes two red lasers 11R1 and 11R2, one blue laser 11B, and two green lasers 11G1 and 11G2. The red laser 11R1 is a light source emitting a red laser beam of P polarization. This is a red laser of TE polarization arranged parallel to the paper plane, or a red laser of TM polarization arranged perpendicular to the paper plane. On the other hand, the red laser 11R2 is a light source emitting a red laser beam of S polarization. This is a red laser of TE polarization arranged perpendicular to the paper plane, or a red laser of TM polarization arranged parallel to the paper plane. The blue laser 11B is a light source emitting a blue laser beam of S polarization. The green laser 11G1 is a light source emitting a green laser beam of S polarization, and the green laser 11G2 is a light source emitting a green laser beam of P polarization. The configurations of the blue laser 11B and the green lasers 11G1 and 11G2 follow the configurations of the red lasers 11R1 and 11R2.

The collimating section 12A includes collimator lenses 12R1, 12R2, 12B, 12G1, and 12G2 that are arranged corresponding to the red lasers 11R1 and 11R2, the blue laser 11B, and the green lasers 11G1 and 11G2, respectively.

The color multiplexing section 13A includes reflective mirrors 13R1 and 13G1, polarization beam splitters (PBSs) 13R2 and 13G2, and dichroic prisms 13B and 13G3. Specifically, the reflective mirror 13R1, the PBS 13R2, the dichroic prism 13B, and the dichroic prism 13G3 are arranged in order from the position farthest from the polarization splitting multiplexing device 1 toward the polarization splitting multiplexing device 1, and are arranged corresponding to the collimator lenses 12R1, 12R2, 12B, and 12G2, respectively. The PBS 13G2 is provided between the dichroic prism 13G3 and the collimator lens 12G2. Further, the reflective mirror 13G1 is provided between the PBS 13G2 and the collimator lens 12G1.

The reflective mirror 13R1 has a reflective surface 131R1. The reflective surface 131R1 reflects, toward the PBS 13R2, the red laser beam of P polarization that has been emitted from the red laser 11R1 and has passed through the collimator lens 12R1 to be collimated into a parallel beam.

The PBS 13R2 has a polarization splitting surface 131R2. The polarization splitting surface 131R2 allows the red laser beam of P polarization from the reflective mirror 13R1 to pass therethrough, and reflects, toward the dichroic prism 13G, the red laser beam of S polarization that has been emitted from the red laser 11R2 and has passed through the collimator lens 12R2 to be collimated into a parallel beam.

The dichroic prism 13B is a prism having a dichroic film 131B. The dichroic film 131B selectively reflects the blue laser beam of S polarization that has been emitted from the blue laser 11B and has been collimated by the collimator lens 12B into a parallel beam, while allowing the red laser beam from the PBS 13R2 to pass therethrough selectively.

The reflective mirror 13G1 has a reflective surface 131G1. The reflective surface 131G1 reflects, toward the PBS 13G2, the green laser beam of S polarization that has been emitted from the green laser 11G1 and has passed through the collimator lens 12G1 to be collimated into a parallel beam.

The PBS 13G2 has a polarization splitting surface 131G2. The polarization splitting surface 131G2 reflects the green laser beam of S polarization from the reflective mirror 13G1 toward the dichroic prism 13G3, and allows the green laser beam of P polarization that has been emitted from the green laser 11G2 and has passed through the collimator lens 12G2 to be collimated into a parallel beam, to pass therethrough.

The dichroic prism 13G3 is a prism having a dichroic film 131G3. The dichroic film 131G3 selectively reflects the green laser beams of P polarization and S polarization, while allowing the red laser beam and the blue laser beam from the dichroic prism 13B to selectively pass therethrough.

The color multiplexing (optical path multiplexing) of the red laser beam, the green laser beam, and the blue laser beam is allowed to be performed appropriately even by the light source section 10A having such a configuration.

<Second Embodiment>

A second embodiment of the disclosure will be described in detail below with reference to drawings.

FIG. 6A illustrates a detailed configuration example of a polarization splitting multiplexing device 1A as the second embodiment. The polarization splitting multiplexing device 1A is applied to the display unit of the above-described first embodiment. However, unlike the polarization splitting multiplexing device 1, in the polarization splitting multiplexing device 1A, it is not necessary to incline a polarization direction of an incident laser beam of linear polarization, with respect to a surface including an optical path of the laser beam that passes through the polarization splitting multiplexing device 1A. In other words, it is sufficient to set the angle Q to 0 degree or 180 degrees. In addition, a right-handed circularly polarized light beam or a left-handed circularly polarized light beam may enter the polarization splitting multiplexing device 1A, in place of the linear polarized light beam. Note that, in FIG. 6A, the case where the linear polarized light beam (P-polarized light beam) enter the polarization splitting multiplexing device 1A is exemplified. For example, the polarization splitting multiplexing device 1A may split the laser beam of P polarization into two laser beams while maintaining the polarization state thereof, to generate an optical path difference, then rotates polarization of one of the laser beams by 90 degrees, and multiplexes the two laser beams whose polarization directions are orthogonal to each other to emit the resultant laser beam. Hereinafter, the polarization splitting multiplexing device 1A will be described focusing mainly on differences from the polarization splitting multiplexing device 1, and like numerals are used to designate substantially like components of the polarization splitting multiplexing device 1, and the description thereof will be appropriately omitted.

(Configuration of Polarization Splitting Multiplexing Device)

The polarization splitting multiplexing device 1A has the pair of optical elements 20 and 30. In the parallel prism 22 of the optical element 20, a non-polarization splitting film 5 is formed on the surface 22S1 facing an inclined surface of the triangular prism 21. Therefore, the optical element 20 has a non-polarization splitting surface (the surface 22S1) and a reflective surface (the surface 22S2) that face each other. The surface 22S1 and the surface 22S2 may be desirably substantially parallel to each other. In addition, the parallel prism 22 may be desirably cut out from one glass plate having a front surface and a back surface that are flat and are substantially parallel to each other. This is because the parallel prism 22 including the surface 22S1 and the surface 22S2 with high degree of parallelism is obtainable more conveniently. The optical element 30 is the same as that in the polarization splitting multiplexing device 1.

The non-polarization splitting film 5 is a so-called half mirror, and for example, may be a multilayer film configured by stacking a plurality of layers including a dielectric body, metal materials, and the like. The non-polarization splitting film 5 does not have wavelength selectivity and polarization selectivity, and allows about half amount of the incident laser beam to pass therethrough and reflects the remaining half amount of the laser beam. Alternatively, the non-polarization splitting film 5 may have wavelength selectivity as long as the non-polarization splitting film 5 allows about half amount of the incident laser beam having a wavelength in a specific range, to pass therethrough and reflects the remaining half amount of the laser beam. Note that ratio of the amount of the transmitting laser beam and the amount of the reflected laser beam in the non-polarization splitting film 5 may be appropriately selected, and is not limited to a ratio of one to one.

In addition, a half-wavelength film (½-wavelength film) 6 is provided between the end surface 22S3 of the optical element 20 and the end surface 32S3 of the optical element 30. For example, the half-wavelength film 6 may be a multilayer film deposited on a surface of the end surface 22S3 or the end surface 32S3. Alternatively, a half-wavelength plate as an independent component may be provided between the end surface 22S3 of the optical element 20 and the end surface 32S3 of the optical element 30.

The surface 22S2 that is a reflective surface of the optical element 20 reflects the laser beam from the surface 22S1 that is a polarization splitting surface, toward the surface 32S2 that is a reflective surface of the optical element 30. The surface 32S2 reflects the laser beam that has been emitted from the surface 22S2 and has passed through the half-wavelength film 6, toward the surface 32S1 that is a polarization splitting surface of the optical element 30.

(Function of Polarization Splitting Multiplexing Device)

Next, a function of the polarization splitting multiplexing device 1 is described with reference to FIG. 6A mainly. The laser beam of each color subjected to color multiplexing (optical path multiplexing) by the color multiplexing section 13 may have one or both of the P-polarized light beam and the S-polarized light beam, for example. In this example, the case where the laser beam having the P-polarized light beam enters is described as an example. For example, the laser beam of P polarization may enter the parallel prism 22 from the end surface 22S4. The laser beam of P polarization that has entered the parallel prism 22 is partially reflected by the surface 22S1 provided with the non-polarization splitting film 5 and then travels toward the surface 22S2. The laser beam of P polarization reached the surface 22S2 is reflected and passes through the end surface 22S3, the half-wavelength film 6, and the end surface 32S3 sequentially, and enters the parallel prism 32. At this time, the laser beam of P polarization is converted into a laser beam of S polarization by the half-wavelength film 6. The converted laser beam of S polarization is reflected by the surface 32S2 and the surface 32S1 sequentially, and is then emitted from the surface 32S4 to the outside. On the other hand, the laser beam of P polarization that has passed through the surface 22S1 provided with the non-polarization splitting film 5 passes through the surface 21S2, the surface 31S2, and the surface 32S1 sequentially and travels in a straight line, and is multiplexed with the above-described laser beam of S polarization to be emitted from the surface 32S4 to the outside. As a result, a part of the laser beam of P polarization that has entered the polarization splitting multiplexing device 1A at the same time is emitted from the polarization splitting multiplexing device 1A as the laser beam of S polarization that has followed optical path longer than that of the resultant part of the laser beam of P polarization. In other words, it is possible to generate an optical delay distance (an optical path length difference) D between the laser beam of S polarization and the laser beam of P polarization. At this time, on the surface 32S1, a position where the laser beam of S polarization is reflected and a position where the laser beam of P polarization passes, namely, an emission position of the laser beam of S polarization and an emission position of the laser beam of P polarization may be desirably substantially coincident with each other. This is to reduce speckle sufficiently.

(Effects)

As described above, an optical path difference with high accuracy is provided between the split laser beam of S polarization and the split laser beam of P polarization. Therefore, also in the second embodiment, it is possible to sufficiently reduce speckle by polarization multiplexing.

In addition, in the second embodiment, the parallel prism 22 that is an integrated component in the optical element 20 has the non-polarization splitting surface (the surface 22S1) and the reflective surface (the surface 22S2) that face each other. Therefore, compared with the case where the non-polarization splitting surface and the reflective surface are provided on different objects and arranged, parallelism between the non-polarization splitting surface (the surface 22S1) and the reflective surface (the surface 22S2) is allowed to be significantly improved, and angle deviation therebetween is allowed to be extremely small (for example, about several arcseconds). Consequently, the display unit mounted with the polarization splitting multiplexing device 1A sufficiently reduces speckle and exerts more favorable picture display performance with a simple configuration.

(Modification 2-1)

FIG. 6B illustrates a configuration example of a polarization splitting multiplexing device 1B as a first modification of the second embodiment, and illustrates an optical path passing through the polarization splitting multiplexing device 1B. In the polarization splitting multiplexing device 1A illustrated in FIG. 6A, the half-wavelength film 6 is provided between the surface 22S3 of the parallel prism 22 and the surface 32S3 of the parallel prism 32. In contrast, in the polarization splitting multiplexing device 1B of the present modification, the half-wavelength film 6 is provided between the surface 21S2 of the triangular prism 21 and the surface 31S2 of the triangular prism 31, instead of between the surface 22S3 and the surface 32S3.

In the present modification, the polarization of each laser beam entering the surface 22S4 of the polarization splitting multiplexing device 1B may be, for example, S polarization. In this case, the laser beam of S polarization that has passed through the non-polarization splitting film 5 on the surface 22S1 passes through the surface 31S2 and is then converted by the half-wavelength film 6 into the laser beam of P polarization. On the other hand, the laser beam of S polarization that has been reflected by the non-polarization splitting film 5 on the surface 22S1 passes as it is through the surface 22S3 and the surface 32S3 sequentially, and is then reflected by the surface 32S2. Subsequently, the laser beam follows the path similar to that in the polarization splitting multiplexing device 1A of FIG. 6A.

Even in the present modification in which the laser beam follows such a path, it is possible to provide an optical path difference with high accuracy between the laser beam of S polarization and the laser beam of P polarization, and accordingly to sufficiently reduce speckle by polarization multiplexing.

(Modification 2-2)

The incident position of the laser beam of P polarization to the polarization splitting multiplexing device 1A is not limited to that illustrated in FIG. 6A, and for example, may be that illustrated in FIG. 7A. FIG. 7A is a diagram illustrating another optical path of the laser beam passing through the polarization splitting multiplexing device 1A (modification 2-2). Incidentally, in FIG. 7A, illustration of the non-polarization splitting film 5, the polarization splitting film 2R, and the reflective films 3L and 3R is omitted. In FIGS. 6A and 6B, the laser beam enters the polarization splitting multiplexing device from the end surface 32S4 of the parallel prism 22 of the optical element 20, and the laser beam that is obtained by multiplexing the laser beam of S polarization and the laser beam of P polarization is emitted from the end surface 32S4 of the parallel prism 32 of the optical element 30. In contrast, in the present modification of FIG. 7A, the laser beam of P polarization enters the polarization splitting multiplexing device 1A from the surface 21S1 of the triangular prism 21 of the optical element 20, and the laser beam that is obtained by multiplexing the laser beam of S polarization and the laser beam of P polarization is emitted from the surface 32S4 of the parallel prism 32 of the optical element 30.

Specifically, the laser beam of P polarization enters the triangular prism 21 from the surface 21S1. The laser beam of P polarization that has entered the triangular prism 21 is partially reflected by the surface 22S1 provided with the non-polarization splitting film 5, then passes through the end surface 21S2 and the end surface 31S2 sequentially, and enters the triangular prism 31. After that, the part of the laser beam passes through the surface 32S1 and travels in a straight line, and is emitted from the end surface 32S4 of the parallel prism 22 to the outside. On the other hand, the remaining part, which is not reflected by the surface 22S1, of the laser beam of P polarization that has entered the triangular prism 21 passes through the surface 22S1, and then reaches the surface 22S2. The laser beam of P polarization reached the surface 22S2 is reflected and passes through the end surface 22S3, the half-wavelength film 6, and the end surface 32S3 sequentially, and enters the parallel prism 32. At this time, the laser beam of P polarization is converted by the half-wavelength film 6 into the laser beam of S polarization. The converted laser beam of S polarization is reflected by the surface 32S2 and the surface 32S1 sequentially, and is multiplexed with the above-described laser beam of P polarization to be emitted from the surface 32S4 to the outside. As a result, the part of the laser beam of P polarization that has entered the polarization splitting multiplexing device 1A at the same time is emitted from the polarization splitting multiplexing device 1A as the laser beam of S polarization that has followed an optical path longer than that of the remaining part of the laser beam of P polarization.

Even in the present modification in which the laser beam follows such a path, it is possible to provide an optical path difference with high accuracy between the split laser beam of S polarization and the split laser beam of P polarization, and accordingly to sufficiently reduce speckle by polarization multiplexing.

(Modification 2-3)

FIG. 7B illustrates another optical path of the laser beam passing through the polarization splitting multiplexing device 1B illustrated in FIG. 6B.

In the present modification, the polarization of each laser beam entering the surface 21S1 of the polarization splitting multiplexing device 1B may be, for example, S polarization. In this case, the laser beam of S polarization that has been reflected by the non-polarization splitting film 5 on the surface 22S1 passes through the surface 31S2, and is then converted by the half-wavelength film 6 into the laser beam of P polarization. On the other hand, the laser beam that has passed through the non-polarization splitting film 5 on the surface 22S1 is reflected as it is by the surface 22S2, then passes through the surface 22S3 and the surface 32S3 sequentially, and is then reflected by the surface 32S2. Subsequently, the laser beam follows the path similar to that of the polarization splitting multiplexing device 1A of FIG. 7A.

Even in the present modification in which the laser beam follows such a path, it is possible to provide an optical path difference with high accuracy between the split laser beam of S polarization and the split laser beam of P polarization, and accordingly to sufficiently reduce speckle by polarization multiplexing.

(Modifications 2-4 and 2-5)

The laser beam of S polarization may enter the polarization splitting multiplexing device 1A. For example, FIG. 8A illustrates an example in which the laser beam of S polarization enters the polarization splitting multiplexing device 1A from the end surface 22S4 of the parallel prism 22 of the optical element 20, and the laser beam that is obtained by multiplexing the laser beam of S polarization and the laser beam of P polarization is emitted from the surface 31S1 of the triangular prism 31 of the optical element 30 (modification 2-4). On the other hand, the laser beam of P polarization may enter the polarization splitting multiplexing device 1B. For example, FIG. 8B illustrates an example in which the laser beam of P polarization enters the polarization splitting multiplexing device 1B from the end surface 22S4 of the parallel prism 22, and the laser beam that is obtained by multiplexing the laser beam of S polarization and the laser beam of P polarization is emitted from the surface 31S1 of the triangular prism 31 (modification 2-5).

Even in the present modifications in which the laser beam follows such a path, it is possible to provide an optical path difference with high accuracy between the split laser beam of S polarization and the split laser beam of P polarization, and accordingly to sufficiently reduce speckle by polarization multiplexing.

(Modifications 2-6 and 2-7)

FIG. 9A illustrates an example in which the laser beam of S polarization enters the polarization splitting multiplexing device 1A from the end surface 21S1 of the triangular prism 21, and the laser beam that is obtained by multiplexing the laser beam of S polarization and the laser beam of P polarization is emitted from the surface 31S1 of the triangular prism 31 (modification 2-6). In addition, FIG. 9B illustrates an example in which the laser beam of P polarization enters the polarization splitting multiplexing device 1B from the end surface 21S1 of the triangular prism 21, and the laser beam that is obtained by multiplexing the laser beam of S polarization and the laser beam of P polarization is emitted from the surface 31S1 of the triangular prism 31 (modification 2-7).

Even in the present modifications in which the laser beam follows such a path, it is possible to provide an optical path difference with high accuracy between the split laser beam of S polarization and the split laser beam of P polarization, and accordingly to sufficiently reduce speckle by polarization multiplexing.

(Modifications 2-8 and 2-9)

The laser beam may enter the polarization splitting multiplexing device 1A from two directions not limited to one direction. For example, FIG. 10A illustrates an example in which the laser beam of P polarization enters the polarization splitting multiplexing device 1A from both the end surface 22S4 of the parallel prism 22 and the end surface 21S1 of the triangular prism 21 of the optical element 20, and the laser beam that is obtained by multiplexing the laser beam of S polarization and the laser beam of P polarization is emitted from the surface 32S4 of the parallel prism 32 of the optical element 30 (modification 2-8). Likewise, the laser beam may enter the polarization splitting multiplexing device 1B from two directions. For example, FIG. 10B illustrates an example in which the laser beam of S polarization enters the polarization splitting multiplexing device 1B from both the end surface 22S4 of the parallel prism 22 and the end surface 21S1 of the triangular prism 21 of the optical element 20, and the laser beam that is obtained by multiplexing the laser beam of S polarization and the laser beam of P polarization is emitted from the surface 32S4 of the parallel prism 32 of the optical element 30 (modification 2-9).

Even in the present modifications in which the laser beam follows such a path, it is possible to provide an optical path difference with high accuracy between the split laser beam of S polarization and the split laser beam of P polarization, and accordingly to sufficiently reduce speckle by polarization multiplexing.

(Modifications 2-10 and 2-11)

FIG. 11A illustrates an example in which the laser beam of S polarization enters the polarization splitting multiplexing device 1A from both the end surface 22S4 of the parallel prism 22 and the end surface 21S1 of the triangular prism 21 of the optical element 20, and the laser beam that is obtained by multiplexing the laser beam of S polarization and the laser beam of P polarization is emitted from the surface 31S1 of the triangular prism 31 of the optical element 30 (modification 2-10). In addition, FIG. 11B illustrates an example in which the laser beam of P polarization enters the polarization splitting multiplexing device 1B from both the end surface 22S4 of the parallel prism 22 and the end surface 21S1 of the triangular prism 21, and the laser beam that is obtained by multiplexing the laser beam of S polarization and the laser beam of P polarization is emitted from the surface 31S1 of the triangular prism 31 of the optical element 30 (modification 2-11).

Even in the present modifications in which the laser beam follows such a path, it is possible to provide an optical path difference with high accuracy between the split laser beam of S polarization and the split laser beam of P polarization, and accordingly to sufficiently reduce speckle by polarization multiplexing.

(Optical System)

FIG. 12 is a schematic diagram illustrating a configuration example of an optical system using the polarization splitting multiplexing device 1A illustrated in FIG. 6A. For example, the optical system may include the light source section 10B and the polarization splitting multiplexing device 1A. The light source section 10B includes the laser light source 11, the collimating section 12, and the color multiplexing section 13. The laser light source section 11 includes the red laser 11R, the green laser 11G, and he blue laser 11B, and the collimating section 12 includes the collimator lenses 12R, 12G, and 12B corresponding to the red laser 11R, the green laser 11G, and the blue laser 11B, respectively. The color multiplexing section 13 is formed of a single dichroic prism having a dichroic film 131. The dichroic film 131 reflects the blue laser beam that has been emitted from the blue laser 11B and has passed through the collimator lens 12B to be collimated into a parallel beam, while allowing the red laser beam that has emitted from the red laser 11R and has passed through the collimator lens 12R to be collimated into a parallel beam, to selectively pass therethrough. The blue laser beam that has been reflected by the dichroic film 131 and the red laser beam that has passed through the dichroic film 131 may enter the polarization splitting multiplexing device 1A from the surface 21S1, for example. Note that the color multiplexing section 13 may be bonded to the surface 21S1 of the polarization splitting multiplexing device 1A, for example. Moreover, for example, the collimator lens 12G may be disposed to face the end surface 22S4. Therefore, the green laser beam that has been emitted from the green laser 11G and has been converted by the collimator lens 12G into a parallel beam enter the polarization splitting multiplexing device 1A from the end surface 22S4. With this configuration, for example, the red laser beam of S polarization and the blue laser beam of S polarization are allowed to enter the polarization splitting multiplexing device 1A from the surface 21S1 and the green laser beam is allowed to enter the polarization splitting multiplexing device 1A from the end surface 22S4, while downsizing of the entire configuration is achieved. In this case, after the split laser beam of S polarization and the split laser beam of P polarization follow the path illustrated in FIGS. 11A and 11B, the laser beam that is formed by multiplexing the split laser beam of S polarization and the split laser beam of P polarization is emitted from the surface 31S1 of the triangular prism 31 of the optical element 30.

(Modification 2-12)

FIG. 13 is a schematic diagram illustrating another configuration example of the optical system using the polarization splitting multiplexing device 1A illustrated in FIG. 6A (modification 2-12). The optical system of the present modification is configured by replacing the light source section 10B of the optical system of the above-described embodiment (FIG. 12) with a light source section 10C.

The light source section 10C includes a laser light source 11C, a collimating section 12C, and a color multiplexing section 13C. The laser light source 11A includes the two red lasers 11R1 and 11R2, the blue laser 11B, and the two green lasers 11G1 and 11G2. Each of the red lasers 11R1 and 11R2 may be a light source emitting, for example, a red laser beam of S polarization, the blue laser 11B may be a light source emitting, for example, a blue laser beam of S polarization, and each of the green lasers 11G1 and 11G2 may be a light source emitting, for example, a green laser beam of S polarization.

The collimating section 12C includes collimator lenses 12R1, 12R2, 12B, 12G1, and 12G2 that are arranged corresponding to the red lasers 11R1 and 11R2, the blue laser 11B, and the green lasers 11G1 and 11G2, respectively.

The color multiplexing section 13C includes reflective mirrors 19R1 and 19R2, and dichroic prisms 19B, 19G1, and 19G2. More specifically, for example, the dichroic prism 19B may be provided at a position facing the surface 21S1 of the polarization splitting multiplexing device 1A. The dichroic prism 19G1 and the reflective mirror 19R1 are provided in order on a side opposite to the polarization splitting multiplexing device 1A with the dichroic prism 19B in between. The dichroic prisms 19B and 19G1 and the reflective mirror 19R1 are arranged corresponding to the collimator lenses 12B, 12G1, and 12R1, respectively. The dichroic prism 19G2 is provided between the surface 22S4 of the polarization splitting multiplexing device 1A and the collimator lens 12G2. Further, the reflective mirror 19R2 is provided between the dichroic prism 19G2 and the collimator lens 12R2.

The reflective mirror 19R1 has a reflective surface 191R1. The reflective surface 191R1 reflects, toward the dichroic prism 19G1, the red laser beam of S polarization that has been emitted from the red laser 11R1 and has passed through the collimator lens 12R1 to be collimated into a parallel beam.

The dichroic prism 19G1 is a prism having a dichroic film 191G1. The dichroic film 191G1 selectively reflects the green laser beam of S polarization that has been emitted from the green laser 11G1 and has been converted by the collimator lens 12G1 into a parallel beam, while allowing the red laser beam from the reflective mirror 19R1 to selectively pass therethrough.

The dichroic prism 19B is a prism having a dichroic film 191B. The dichroic film 191B selectively reflects the blue laser beam of S polarization that has been emitted from the blue laser 11B and has been converted by the collimator lens 12B into a parallel beam, while allowing the green laser beam and the red laser beam from the dichroic prism 19G1 to selectively pass therethrough.

The reflective mirror 19R2 has a reflective surface 191R2. The reflective surface 191R2 reflects, toward the dichroic prism 19G2, the red laser beam of S polarization that has been emitted from the red laser 11R2 and has passed through the collimator lens 12R2 to be collimated into a parallel beam.

The dichroic prism 19G2 is a prism having a dichroic film 191G2. The dichroic film 191G2 allows the green laser beam of S polarization that has been emitted from the green laser 11G2 and has been converted by the collimator lens 12G2 into a parallel beam, to selectively pass therethrough, while selectively reflecting the red laser beam from the reflective mirror 19R2.

Even with the light source section 10C having such a configuration, it is possible to appropriately perform color multiplexing (optical path multiplexing) of the red laser beam, the green laser beam, and the blue laser beam.

Note that, in any of the above-described embodiments and modifications, the parallel prism 22 and the parallel prism 32 may desirably have the same height. In addition, the parallel prism 22 and the triangular prism 21 may be desirably formed of the same material, and the parallel prism 32 and the triangular prism 31 may be desirably formed of the same material. On the other hand, the material of the parallel prism 22 and the triangular prism may be different from the material of the parallel prism 32 and the triangular prism 31. Appropriately changing the materials enables adjustment of the optical delay distance D. For example, two materials that have different wavelength dispersion may be combined.

EXAMPLES

Hereinafter, specific examples of the embodiments of the technology will be described.

Experimental Example 1

Experimental Example 1-1

In the present Experimental Example, a display unit having an optical system (FIG. 14A) that includes the polarization splitting multiplexing device 1 of the above-described embodiment was fabricated, and the reducing effect of speckle was evaluated. Incidentally, the distance between the optical element 20 and the optical element 30 was variable, and the optical delay distance D was variable. Note that, in FIG. 14A, illustration of the color multiplexing section 13 is omitted. In addition, in the optical system, in a plane orthogonal to an optical axis, the polarization splitting multiplexing device 1 was inclined by 45 degrees with respect to the light source section 10 with the optical axis serving as a central axis, as illustrated in FIG. 14B. In other words, a surface including the optical path of the laser beam in the polarization splitting multiplexing device 1 was arranged so as to make an angle of 45 degrees or 135 degrees with respect to a polarization axis of the laser beam that is a linear polarized light beam. As the laser light source 11, a blue semiconductor laser of TE polarization was used and arranged so that a polarization direction thereof was parallel to the paper plane. The semiconductor laser was DC driven. The laser beam was parallelized by the collimator lens 12 including an aspheric surface, passed through the polarization splitting multiplexing device 1, was subjected to two-dimensional scanning by the MEMS mirror (not illustrated), and then was projected on a screen (not illustrated).

Speckle contrast was used for evaluation of speckle reduction. The speckle contrast is a value obtained by taking in an image projected on the screen by a camera, and dividing the standard deviation of brightness by average brightness. The camera lens used was set in such a manner that minimum speckle pattern was larger than a cell size of charge coupled device (CCD), the cell size of the CCD was set to 4.4 micrometers, f-number of the camera was set to 11, and a focal distance f was set to 40 millimeters. In addition, a distance between the screen and the camera was set to 90 centimeters. The speckle pattern perceived by a person was integrated by time, and the exposure time was 1/60 seconds corresponding to one frame.

FIG. 15A illustrates a brightness distribution of the image projected on the screen in the present Experimental Example. Incidentally, the optical delay distance D was set to 23.5 millimeters. The standard deviation of the brightness after back ground noise was subtracted from the data was 5.83, the average brightness was 31.2, and as a result, the speckle contrast Cs=18.8% was obtained.

Experimental Example 1-2

As a comparative example to the above-described Experimental Example 1-1, the display unit having the same configuration except that the polarization splitting multiplexing device 1 was not included was fabricated, and similar observation of speckle was performed.

FIG. 15B illustrates a brightness distribution of the image projected on the screen in the present Experimental Example. The standard deviation of the brightness after back ground noise is subtracted from the data was 9.54, and the average brightness was 40.1. As a result, the speckle contrast Cs=23.8% was obtained.

From the comparison between the Experimental Example 1-1 and the Experimental Example 1-2 described above, relative speckle contrast was about 79% (=18.8/23.8).

Experimental Example 2

Next, relationship between the relative speckle contrast and the optical delay distance D in the display unit including the optical system illustrated in FIG. 14A was examined. FIG. 16 illustrates the results. As illustrated in FIG. 16, it was found that the relative speckle contrast shows peaks with a certain cycle, along with variation of the optical delay distance D.

The wavelength of the laser beam used was 445 nanometers, and $2*neff*L$ as a resonance condition of the semiconductor laser was about 3.7 millimeters. The cycle of the peaks appeared in FIG. 16 is coincident with $2*neff*L$. It is known that coherency of the semiconductor laser measured with use of Michelson interferometer is increased by the integral multiple of $2*neff*L$, and it is conceivable that the same applies to the present Experimental Example. The relative speckle contrast takes a minimum value at $2*neff*L*(m+0.5)$, where m is a natural number, and sufficient effect is expected when the following expression (2) is satisfied. Note that when the optical delay distance D was 12.5 millimeters, the relative speckle contrast was 80%.
[Math. 2]
$$2*neff*L*(m+0.2) \leq D \leq 2*neff*L*(m+0.8) \quad (2)$$

Moreover, in the display unit including the optical system illustrated in FIG. 14A, deviation of divergence angle of the laser beam that had passed through the polarization splitting multiplexing device 1 was sufficiently suppressed, and the deviation was not confirmed by visual observation. Note that the theoretical value of speckle reduction by polarization multiplexing is $\frac{1}{2}^{0.5}$. However, in actual, it is difficult to make the cross-correlation between the two beams (the P-polarized light beam and the S-polarized light beam) split by the polarization splitting multiplexing device 1 zero (0), and it is conceivable that the experimental results correspond to the case of the cross-correlation of 1/e.

Experimental Example 3

Next, relationship between relative speckle contrast and a wavelength difference in the display unit including the optical system illustrated in FIGS. 17A and 17B was examined. FIG. 18 illustrates the results.

The optical system in the Experimental Example 1-1 uses one laser light source, and has a simple overall configuration. Therefore, it is suitable for the purpose of microminiaturization. In contrast, the optical system in the present Experimental Example uses two laser light sources, and is suitable for further reducing speckle contrast. Actually, it is important to reduce speckle contrast of red and green in particular by the configuration of a retina. Therefore, the applicant studied the configuration using two semiconductor lasers for each color.

In a LBS projector, a beam spot is small and flexibility of angle multiplexing is restricted, and therefore it is desired that polarization multiplexing and wavelength multiplexing are used together to reduce speckle. To obtain sufficient wavelength multiplexing, two semiconductor lasers of the same color with different wavelengths may be preferably used. However, it is actually difficult to form two laser beams with large wavelength difference therebetween by the semiconductor lasers of the same material system, and it is difficult to perform multiplexing by a dichroic prism and a dichroic mirror. Therefore, the two laser beams are multiplexed by a polarization beam splitter. In theory, cross-correlation between two independent light sources is zero, and reduction of speckle contrast of about 71% (=$\frac{1}{2}^{0.5}$) is expected by multiplexing the P-polarized light beam and the S-polarized light beam, for example. In addition, speckle pattern shows a change by providing a wavelength difference between the two laser light sources, and reduction of the speckle contrast of about 71% (=$\frac{1}{2}^{0.5}$) at a maximum is expected. However, with the combination (that is, the two semiconductor lasers different from each other in both wavelength and polarization), polarization multiplexing and wavelength multiplexing are degenerated, and effect of about 71% (=$\frac{1}{2}^{0.5}$) or more is not expected. Therefore, the applicant confirmed that the above-described degeneracy is dissolved by employing the polarization splitting multiplexing device described in the above-described embodiments.

In the optical system illustrated in FIGS. 17A and 17B, a red semiconductor laser 51B that emits a red laser beam having a wavelength of 637.3 nanometers was arranged so that the polarization direction thereof was perpendicular to the paper plane, and a red semiconductor laser 51A was arranged so that the polarization direction thereof was parallel to the paper plane. After the red laser beams from the red semiconductor lasers 51A and 51B were converted into parallel beam flux by aspheric lenses 52A and 52B, respectively, the parallelized red laser beams were multiplexed through a reflective mirror 53B and a polarization beam splitter (PBS) 53A, and then entered the polarization splitting multiplexing device 1. At this time, the laser beam from the red semiconductor laser 51A was adjustable within a range of 636 nanometers to 643.4 nanometers both inclusive by varying a temperature. The multiplexed laser beam passed through the polarization splitting multiplexing device 1, was then subjected to two-dimensional scanning by a MEMS mirror (not illustrated), and was projected on a screen (not illustrated). Incidentally, as illustrated in FIG. 17B, also in the optical system, the polarization splitting multiplexing device 1 was inclined and arranged so that a surface including the optical path of the laser beam in the polarization splitting multiplexing device 1 makes an angle of 45 degrees or 135 degrees with respect to the polarization axis of each laser beam.

Experimental Example 3-1

In FIG. 18, a horizontal axis indicates a wavelength difference between the red semiconductor laser 51A and the red semiconductor laser 51B, and a vertical axis indicates relative speckle contrast. In FIG. 18, "black circle" indicates degeneracy of polarization multiplexing and that of wavelength multiplexing. More specifically, the relative speckle contrast of "black circle" is a value obtained by dividing speckle contrast in the case where two laser light sources multiplexed by a polarization beam splitter was used, by speckle contrast in the case where one laser light source emitting red laser light having a wavelength of 637.3 nanometers was used. When the wavelength difference is zero, the relative speckle contrast of about 71% is obtained, and thus it is found that the polarization multiplexing is reduced to about theoretical value. Note that, even in the case where a wavelength difference was generated between laser beams from two laser light sources, the relative speckle contrast was about 71%.

Experimental Example 3-2

Moreover, "black square" in FIG. 18 indicates relative speckle contrast obtained by dividing speckle contrast in the case where the optical system in FIG. 17A was used, by speckle contrast in the case where the optical system in which the polarization splitting multiplexing device 1 was eliminated from the optical system in FIG. 17A was used. The case where the optical system in FIG. 17A was used indicates the case where two laser beams from the two laser light sources were multiplexed by the polarization beam splitter and then the multiplexed beam was allowed to pass through the polarization splitting multiplexing device 1. The case where the optical system in which the polarization splitting multiplexing device 1 was eliminated from the optical system in FIG. 17A was used indicates the case where the two laser beams from the two laser light sources were multiplexed by the polarization beam splitter, but the multiplexed beam was not allowed to pass through the polarization splitting multiplexing device 1. It was found that the relative speckle contrast of about 80% was obtainable by using the polarization splitting multiplexing device 1. Note that the term "PSMD" in FIG. 18 indicates the polarization splitting multiplexing device.

Experimental Example 3-3

Further, "black rhombus" indicates relative speckle contrast that is obtained by dividing speckle contrast in the case where the optical system in FIG. 17A was used, by speckle contrast in the case where one laser light source emitting red laser beam was used. It was found that when the wavelength difference between the two laser beams was substantially zero (0), the value was not largely different from the value in the Experimental Example 3-1, however when (an absolute value of) the wavelength difference was about 1 nanometer or more, the relative speckle contrast was improved to about 57%. It was conceivable that it was a product of speckle reduction effect (about 71% ($=\frac{1}{2}^{0.5}$)) by the wavelength multiplexing and reduction effect (about 80%) obtained by employing the polarization splitting multiplexing device 1 described in the above-described Experimental Example 3-2.

As described above, it was confirmed that, by employing the polarization splitting multiplexing device of any of the embodiments of the technology, it is possible to dissolve degeneracy of the polarization multiplexing and the wavelength multiplexing, and thus to achieve further reduction of speckle contrast.

Hereinbefore, although the technology has been described with referring to the embodiments, the modifications, and the Experimental Examples, the technology is not limited to the above-described embodiments and the like, and various modifications may be made. For example, the configuration of the light source section (for example, kinds of laser light sources, the number thereof) and the positional relationship between the light source section and the polarization splitting multiplexing device are not limited to those illustrated in the above-described embodiments and the like.

In addition, in the above-described embodiments and the like, the MEMS mirror has been exemplified and described as the scan section scanning the laser beam. However, in the technology, for example, a low-speed vertical mirror using a ultrasonic motor or a galvanometer mirror other than the MEMS mirror may be used.

Moreover, in the above-described embodiments and the like, the case where the laser beam of linear polarization is used has been exemplified and described. However, in the technology, a laser beam of circular polarization may be used.

Furthermore, the technology may be configured as follows.

(1) An optical system comprising a light source configured to emit a light; and a polarizing splitting multiplexing device including a first prism configured to split the light into two polarized light beams having different optical path lengths, and a second prism configured to combine the two polarized light beams. The first prism includes a first reflective surface and a first polarization splitting surface facing the first reflective surface, and the second prism includes a second reflective surface and a second polarization splitting surface facing the second reflective surface.

(2) An optical system according to (1), wherein at least one of the first prism and the second prism includes a transparent plate having a front surface and a back surface that are flat and substantially parallel to each other.

(3) An optical system according to any one of (1) and (2), wherein each of the first polarization splitting surface and the second polarization splitting surface has a reflective film including at least one of a metal film and a dielectric film.

(4) An optical system according to any one of (1) to (3), wherein each of the first reflective surface and the second reflective surface has a polarization splitting film including at least one of a dielectric film and a wire grid.

(5) An optical system according to any one of (1) to (4), wherein the polarizing splitting multiplexing device includes a first triangular prism facing the first polarization splitting surface and a second triangular prism facing the second polarization splitting surface.

(6) An optical system according to (5), wherein a first polarized light beam has an optical path through the first prism and the second prism, and a second polarized light beam has an optical path through the first triangular prism and the second triangular prism.

(7) An optical system according to any one of (1) to (6), wherein the optical system is a projector.

(8) An optical system according to any one of (1) to (7), wherein the light source is a laser light source.

(9) An optical system according to any one of (1) to (8), wherein the first prism is adjacent to the second prism.

(10) A polarizing splitting multiplexing device comprising a first prism configured to split a light into two polarized light beams having different optical path lengths, wherein the first prism includes a first reflective surface and a first polarization splitting surface facing the first reflective surface; and a second prism configured to combine the two polarized light beams, wherein the second prism includes a second reflective surface and a second polarization splitting surface facing the second reflective surface.

(11) A polarizing splitting multiplexing device according to (11), wherein at least one of the first prism and the second prism includes a transparent plate having a front surface and a back surface that are flat and substantially parallel to each other.

(12) A polarizing splitting multiplexing device according to any one of (10) and (11), wherein each of the first polarization splitting surface and the second polarization splitting surface has a reflective film including at least one a dielectric multilayer film and a combination of a metal film and a dielectric film.

(13) A polarizing splitting multiplexing device according to any one of (10) to (12), wherein each of the first reflective surface and the second reflective surface has a polarization splitting film including at least one of a dielectric multilayer film and a wire grid.

(14) A polarizing splitting multiplexing device according to any one of (10) to (13), further comprising a first triangular prism facing the first polarization splitting surface; and a second triangular prism facing the second polarization splitting surface.

(15) A polarizing splitting multiplexing device according to (14), wherein a first polarized light beam has an optical path through the first prism and the second prism, and a second polarized light beam has an optical path through the first triangular prism and the second triangular prism.

(16) A polarizing splitting multiplexing device according to any one of (10) and (15), wherein the first prism is adjacent to the second prism.

(17) A display unit comprising a light source configured to emit a light; and a polarizing splitting multiplexing device including a first prism configured to split the light into two polarized light beams having different optical path lengths, and a second prism configured to combine the two polarized light beams. The first prism includes a first reflective surface and a first polarization splitting surface facing the first reflective surface, and the second prism includes a second reflective surface and a second polarization splitting surface facing the second reflective surface.

[1] A polarization splitting multiplexing device including:
a first optical element having a first polarization splitting surface and a first reflective surface that face each other; and
a second optical element having a second polarization splitting surface and a second reflective surface that face each other, wherein
the first reflective surface reflects light from the first polarization splitting surface toward the second reflective surface,
the second reflective surface reflects light from the first reflective surface toward the second polarization splitting surface,
the first polarization splitting surface is parallel to the first reflective surface, and
the second polarization splitting surface is parallel to the second reflective surface.

[2] The polarization splitting multiplexing device according to [1], wherein
the first optical element has a first end surface connecting the first polarization splitting surface and the first reflective surface, and
the second optical element has a second end surface connecting the second polarization splitting surface and the second reflective surface, the second end surface facing the first end surface.

[3] The polarization splitting multiplexing device according to [1] or [2], wherein
the first optical element has a first prism cut out from one transparent plate, the first prism including the first polarization splitting surface and the first reflective surface, and
the second optical element has a second prism cut out from one of the one transparent plate and another transparent plate, the second prism including the second polarization splitting surface and the second reflective surface.

[4] The polarization splitting multiplexing device according to [3], wherein
the first optical element further has a third prism including a first inclined surface, the first inclined surface of the third prism facing the first polarization splitting surface of the first prism, and
the second optical element further has a fourth prism including a second inclined surface, the second inclined surface of the fourth prism facing the second polarization splitting surface of the second prism.

[5] A polarization splitting multiplexing device including:
a first optical element having a non-polarization splitting surface and a first reflective surface that face each other;
a second optical element having a polarization splitting surface and a second reflective surface that face each other; and
a half-wavelength element provided between the first optical element and the second optical element, wherein
the first reflective surface reflects, toward the second reflective surface, light reflected by the non-polarization splitting surface,
the second reflective surface reflects, toward the polarization splitting surface, light that is reflected by the first reflective surface and then passes through the half-wavelength element,
the polarization splitting surface multiplexes the light reflected by the second reflective surface and the light that passes through the non-polarization splitting surface and then reaches the polarization splitting surface without the half-wavelength element,
the non-polarization splitting surface is parallel to the first reflective surface, and
the polarization splitting surface is parallel to the second reflective surface.

[6] The polarization splitting multiplexing device according to [5], wherein
the first optical element has a first end surface connecting the non-polarization splitting surface and the first reflective surface, and
the second optical element has a second end surface connecting the polarization splitting surface and the second reflective surface, the second end surface facing the first end surface.

[7] The polarization splitting multiplexing device according to [5] or [6], wherein
the first optical element has a first prism cut out from one transparent plate, the first prism including the non-polarization splitting surface and the first reflective surface, and
the second optical element has a second prism cut out from one of the one transparent plate and another transparent plate, the second prism including the polarization splitting surface and the second reflective surface.

[8] The polarization splitting multiplexing device according to [7], wherein the first optical element further has a third prism including a first inclined surface, the first inclined surface of the third prism facing the non-polarization splitting surface of the first prism, and the second optical element further has a fourth prism including a second inclined surface, the second inclined surface of the fourth prism facing the polarization splitting surface of the second prism.

[9] A polarization splitting multiplexing device including:

a first optical element having a non-polarization splitting surface and a first reflective surface that face each other;

a second optical element having a polarization splitting surface and a second reflective surface that face each other; and a half-wavelength element provided between the first optical element and the second optical element, wherein the first reflective surface reflects, toward the second reflective surface, light reflected by the non-polarization splitting surface, the second reflective surface reflects, toward the polarization splitting surface, light reflected by the first reflective surface, the polarization splitting surface multiplexes the light reflected by the second reflective surface and the light that passes through the non-polarization splitting surface and then passes through the half-wavelength element, the non-polarization splitting surface is parallel to the first reflective surface, and the polarization splitting surface is parallel to the second reflective surface.

[10] The polarization splitting multiplexing device according to [9], wherein the first optical element has a first end surface connecting the non-polarization splitting surface and the first reflective surface, and the second optical element has a second end surface connecting the polarization splitting surface and the second reflective surface, the second end surface facing the first end surface.

[11] The polarization splitting multiplexing device according to [9] or [10], wherein the first optical element has a first prism cut out from one transparent plate, the first prism including the non-polarization splitting surface and the first reflective surface, and the second optical element has a second prism cut out from one of the one transparent plate and another transparent plate, the second prism including the polarization splitting surface and the second reflective surface.

[12] The polarization splitting multiplexing device according to [11], wherein the first optical element further has a third prism including a first inclined surface, the first inclined surface of the third prism facing the non-polarization splitting surface of the first prism, and the second optical element further has a fourth prism including a second inclined surface, the second inclined surface of the fourth prism facing the polarization splitting surface of the second prism.

[13] An optical system including:

a light source section including a laser light source; and a polarization splitting multiplexing device allowing a laser beam from the light source section to pass therethrough, wherein the polarization splitting multiplexing device includes a first optical element and a second optical element, the first optical element having a first polarization splitting surface and a first reflective surface that face each other, and the second optical element having a second polarization splitting surface and a second reflective surface that face to each other, the first reflective surface reflects light from the first polarization splitting surface toward the second reflective surface, the second reflective surface reflects light from the first reflective surface toward the second polarization splitting surface, the first polarization splitting surface is parallel to the first reflective surface, and the second polarization splitting surface is parallel to the second reflective surface.

[14] The optical system according to [13], wherein the light source section includes, as the laser light source, one or more red laser light sources each emitting a red laser beam, one or more green laser light sources each emitting a green laser beam, and one or more blue laser light sources each emitting a blue laser beam, and all of the red laser beam, the green laser beam, and the blue laser beam enter the polarization splitting multiplexing device.

[15] The optical system according to [13], wherein the laser light source is a semiconductor laser, the semiconductor laser has a peak cycle Lc of coherency measured by Michelson interferometer, and an optical delay distance D in the polarization splitting multiplexing device is represented by an expression [1],

[Math. 3]

$$Lc^*(m+0.2) \leq D \leq Lc^*(m+0.8) \qquad [1]$$

where m represents a natural number.

[16] The optical system according to [15], wherein the light source section includes two or more semiconductor lasers of substantially same color, and the two or more semiconductor lasers of substantially same color emit laser beams having peak wavelengths different from one another by about 1 nanometer or more, and the emitted laser beams enter the polarization splitting multiplexing device.

[17] An optical system including:

a light source section including a laser light source; and a polarization splitting multiplexing device allowing a laser beam from the light source section to pass therethrough, wherein the polarization splitting multiplexing device includes a first optical element, a second optical element, and a half-wavelength element, the first optical element having a non-polarization splitting surface and a first reflective surface that face each other, the second optical element having a polarization splitting surface and a second reflective surface that face each other, and the half-wavelength element being provided between the first optical element and the second optical element, the first reflective surface reflects, toward the second reflective surface, light reflected by the non-polarization splitting surface, the second reflective surface reflects, toward the polarization splitting surface, light that is reflected by the first reflective surface and then passes through the half-wavelength element, the polarization splitting surface multiplexes the light reflected by the second reflective surface and the light that passes through the non-polarization splitting surface and then reaches the polarization splitting surface without the half-wavelength element, the non-polarization splitting surface is parallel to the first reflective surface, and the polarization splitting surface is parallel to the second reflective surface.

[18] The optical system according to [17], wherein
the light source section includes, as the laser light source, one or more red laser light sources each emitting a red laser beam, one or more green laser light sources each emitting a green laser beam, and one or more blue laser light sources each emitting a blue laser beam, and all of the red laser beam, the green laser beam, and the blue laser beam enter the polarization splitting multiplexing device.

[19] The optical system according to [18], wherein
the laser light source is a semiconductor laser,
the semiconductor laser has a peak cycle Lc of coherency measured by Michelson interferometer, and
an optical delay distance D in the polarization splitting multiplexing device is represented by an expression [1],
[Math. 3]

$$Lc*(m+0.2) \leq D \leq Lc*(m+0.8) \qquad [1]$$

[20] The optical system according to [19], wherein
the light source section includes two or more semiconductor lasers of substantially same color, and
the two or more semiconductor lasers of substantially same color emit laser beams having peak wavelengths different from one another by about 1 nanometer or more, and the emitted laser beams enter the polarization splitting multiplexing device.

[21] An optical system including:
a light source section including a laser light source; and
a polarization splitting multiplexing device allowing a laser beam from the light source section to pass therethrough, wherein
the polarization splitting multiplexing device includes a first optical element, a second optical element, and a half-wavelength element, the first optical element having a non-polarization splitting surface and a first reflective surface that face each other, the second optical element having a polarization splitting surface and a second reflective surface that face each other, and the half-wavelength element being provided between the first optical element and the second optical element,
the first reflective surface reflects, toward the second reflective surface, light reflected by the non-polarization splitting surface,
the second reflective surface reflects, toward the polarization splitting surface, light that is reflected by the first reflective surface,
the polarization splitting surface multiplexes the light reflected by the second reflective surface and the light that passes through the non-polarization splitting surface and then passes through the half-wavelength element,
the non-polarization splitting surface is parallel to the first reflective surface, and
the polarization splitting surface is parallel to the second reflective surface.

[22] The optical system according to [21], wherein
the light source section includes, as the laser light source, one or more red laser light sources each emitting a red laser beam, one or more green laser light sources each emitting a green laser beam, and one or more blue laser light sources each emitting a blue laser beam, and
all of the red laser beam, the green laser beam, and the blue laser beam enter one polarization splitting multiplexing device.

[23] The optical system according to [22], wherein
the laser light source is a semiconductor laser,
the semiconductor laser has a peak cycle Lc of coherency measured by Michelson interferometer, and
an optical delay distance D in the polarization splitting multiplexing device is represented by an expression [1],
[Math. 3]

$$Lc*(m+0.2) \leq D \leq Lc*(m+0.8) \qquad [1]$$

where m represents a natural number.

[24] The optical system according to [23], wherein
the light source section includes two or more semiconductor lasers of substantially same color, and
the two or more semiconductor lasers of substantially same color emit laser beams having peak wavelengths different from one another by about 1 nanometer or more, and the emitted laser beams enter the polarization splitting multiplexing device.

[25] A display unit including:
a light source section including a laser light source;
a polarization splitting multiplexing device allowing a laser beam from the light source section to pass therethrough; and
a scan section scanning the laser beam that passes through the polarization splitting multiplexing device, wherein
the polarization splitting multiplexing device includes a first optical element and a second optical element, the first optical element having a first polarization splitting surface and a first reflective surface that face each other, and the second optical element having a second polarization splitting surface and a second reflective surface that face each other,
the first reflective surface reflects light from the first polarization splitting surface toward the second reflective surface,
the second reflective surface reflects light from the first reflective surface toward the second polarization splitting surface,
the first polarization splitting surface is parallel to the first reflective surface, and
the second polarization splitting surface is parallel to the second reflective surface.

[26] The display unit according to [25], wherein
the light source section includes, as the laser light source, one or more red semiconductor lasers each emitting a red laser beam, one or more green semiconductor lasers each emitting a green laser beam, and one or more blue semiconductor lasers each emitting a blue laser beam,
each of the red semiconductor lasers, the green semiconductor lasers, and the blue semiconductor lasers has a peak cycle Lc of coherency measured by Michelson interferometer,
an optical delay distance D in the polarization splitting multiplexing device is represented by an expression [1], and
all of the red laser beam, the green laser beam, and the blue laser beam enter one polarization splitting multiplexing device,
[Math. 3]

$$Lc*(m+0.2) \leq D \leq Lc*(m+0.8) \qquad [1]$$

where m represents a natural number.

[27] The display unit according to [26], wherein the light source section includes two or more red semiconductor lasers emitting red laser beams having peak wavelengths different from one another by about 1 nanometer or more, two or more green semiconductor lasers emitting green laser beams having peak wavelengths different from one another by about 1 nanometer or more, and two or more blue semiconductor lasers emitting blue laser beams having peak wavelengths different from one another by about 1 nanometer or more.

[28] A display unit including:

a light source section including a laser light source;

a polarization splitting multiplexing device allowing a laser beam from the light source section to pass therethrough; and a scan section scanning the laser beam that passes through the polarization splitting multiplexing device, wherein the polarization splitting multiplexing device includes a first optical element, a second optical element, and a half-wavelength element, the first optical element including a non-polarization splitting surface and a first reflective surface that face each other, the second optical element including a polarization splitting surface and a second reflective surface that face each other, and the half-wavelength element being provided between the first optical element and the second optical element, the first reflective surface reflects, toward the second reflect surface, light reflected by the non-polarization splitting surface, the second reflective surface reflects, toward the polarization splitting surface, light that is reflected by the first reflective surface and then passes through the half-wavelength element, the polarization splitting surface multiplexes the light reflected by the second reflective surface and the light that passes through the non-polarization splitting surface and then reaches the polarization splitting surface without the half-wavelength element, the non-polarization splitting surface is parallel to the first reflective surface, and the polarization splitting surface is parallel to the second reflective surface.

[29] The display unit according to [28], wherein the light source section includes, as the laser light source, one or more red semiconductor lasers each emitting a red laser beam, one or more green semiconductor lasers each emitting a green laser beam, and one or more blue semiconductor lasers each emitting a blue laser beam, each of the red semiconductor lasers, the green semiconductor lasers, and the blue semiconductor lasers has a peak cycle Lc of coherency measured by Michelson interferometer, an optical delay distance D in the polarization splitting multiplexing device is represented by an expression [1], and all of the red laser beam, the green laser beam, and the blue laser beam enter one polarization splitting multiplexing device,

[Math. 3]

$$Lc^*(m+0.2) \leq D \leq Lc^*(m+0.8) \qquad [1]$$

where m represents a natural number.

[30] The display unit according to [29], wherein the light source section includes two or more red semiconductor lasers emitting red laser beams having peak wavelengths different from one another by about 1 nanometer or more, two or more green semiconductor lasers emitting green laser beams having peak wavelengths different from one another by about 1 nanometer or more, and two or more blue semiconductor lasers emitting blue laser beams having peak wavelengths different from one another by about 1 nanometer or more.

[31] A display unit including:

a light source section including a laser light source;

a polarization splitting multiplexing device allowing a laser beam from the light source section to pass therethrough; and a scan section scanning the laser beam that passes through the polarization splitting multiplexing device, wherein the polarization splitting multiplexing device includes a first optical element, a second optical element, and a half-wavelength element, the first optical element including a non-polarization splitting surface and a first reflective surface that face each other, the second optical element including a polarization splitting surface and a second reflective surface that face each other, and the half-wavelength element being provided between the first optical element and the second optical element, the first reflective surface reflects, toward the second reflective surface, light reflected by the non-polarization splitting surface, the second reflective surface reflects, toward the polarization splitting surface, light reflected by the first reflective surface, the polarization splitting surface multiplexes the light reflected by the second reflective surface and the light that passes through the non-polarization splitting surface and then passes through the half-wavelength element, the non-polarization splitting surface is parallel to the first reflective surface, and the polarization splitting surface is parallel to the second reflective surface.

[32] The display unit according to [31], wherein the light source section includes, as the laser light source, one or more red semiconductor lasers each emitting a red laser beam, one or more green semiconductor lasers each emitting a green laser beam, and one or more blue semiconductor lasers each emitting a blue laser beam, each of the red semiconductor lasers, the green semiconductor lasers, and the blue semiconductor lasers has a peak cycle Lc of coherency measured by Michelson interferometer, an optical delay distance D in the polarization splitting multiplexing device is represented by an expression [1], and all of the red laser beam, the green laser beam, and the blue laser beam enter one polarization splitting multiplexing device,

[Math. 3]

$$Lc^*(m+0.2) \leq D \leq Lc^*(m+0.8) \qquad [1]$$

where m represents a natural number.

[33] The display unit according to [32], wherein the light source section includes two or more red semiconductor lasers emitting red laser beams having peak wavelengths different from one another by about 1 nanometer or more, two or more green semiconductor lasers emitting green laser beams having peak wavelengths different from one another by about 1 nanometer or more, and two or more blue semiconductor lasers emitting blue laser beams having peak wavelengths different from one another by about 1 nanometer or more.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

REFERENCE SIGNS LIST 1 polarization splitting multiplexing device
2 (2L, 2R) polarization splitting film
3 (3L, 3R) reflective film
5 non-polarization splitting film
6 half-wavelength film
10 light source section
11 laser light source
12 collimating section
13 color multiplexing section
14 MEMS mirror
15 quarter-wavelength plate
17 screen
20, 30 optical element
21, 31 triangular prism
22, 32 parallel prism

The invention claimed is:

1. An optical system comprising:
a light source configured to emit a light; and
a polarizing splitting multiplexing device including a first prism configured to split the light into two polarized light beams having different optical path lengths, and a second prism configured to combine the two polarized light beams, wherein
the first prism is cut out from one transparent plate and includes a first reflective surface and a first polarization splitting surface facing the first reflective surface, the second prism is cut out from one of the one transparent plate and another transparent plate and includes a second reflective surface and a second polarization splitting surface facing the second reflective surface, and a half-wavelength film provided between a first end surface of the first prism and a second end surface of the second prism.

2. The optical system according to claim 1, wherein at least one of the first prism and the second prism has a front surface and a back surface that are flat and substantially parallel to each other.

3. The optical system according to claim 1, wherein each of the first polarization splitting surface and the second polarization splitting surface has a reflective film including at least one of a metal film and a dielectric film.

4. The optical system according to claim 1, wherein each of the first reflective surface and the second reflective surface has a polarization splitting film including at least one of a dielectric film and a wire grid.

5. The optical system according to claim 1, wherein the polarizing splitting multiplexing device includes a first triangular prism facing the first polarization splitting surface and a second triangular prism facing the second polarization splitting surface.

6. The optical system according to claim 5, wherein a first polarized light beam of the two polarized light beams has an optical path through the first prism and the second prism, and a second polarized light beam of the two polarized light beams has an optical path through the first triangular prism and the second triangular prism.

7. The optical system according to claim 1, wherein the optical system is a projector.

8. The optical system according to claim 1, wherein the light source is a laser light source.

9. The optical system according to claim 1, wherein the first prism is adjacent to the second prism.

10. A polarizing splitting multiplexing device comprising:
a first prism configured to split a light into two polarized light beams having different optical path lengths, wherein the first prism is cut out from one transparent plate and includes a first reflective surface and a first polarization splitting surface facing the first reflective surface;
a second prism configured to combine the two polarized light beams, wherein the second prism is cut out from one of the one transparent plate and another transparent plate and includes a second reflective surface and a second polarization splitting surface facing the second reflective surface; and
a half-wavelength film provided between a first end surface of the first prism and a second end surface of the second prism.

11. The polarizing splitting multiplexing device according to claim 10, wherein at least one of the first prism and the second prism has a front surface and a back surface that are flat and substantially parallel to each other.

12. The polarizing splitting multiplexing device according to claim 10, wherein each of the first polarization splitting surface and the second polarization splitting surface has a reflective film including at least one a dielectric multilayer film and a combination of a metal film and a dielectric film.

13. The polarizing splitting multiplexing device according to claim 10, wherein each of the first reflective surface and the second reflective surface has a polarization splitting film including at least one of a dielectric multilayer film and a wire grid.

14. The polarizing splitting multiplexing device according to claim 10, further comprising:
a first triangular prism facing the first polarization splitting surface; and
a second triangular prism facing the second polarization splitting surface.

15. The polarizing splitting multiplexing device according to claim 14, wherein
a first polarized light beam of the two polarized light beams has an optical path through the first prism and the second prism, and
a second polarized light beam of the two polarized light beams has an optical path through the first triangular prism and the second triangular prism.

16. The polarizing splitting multiplexing device according to claim 10, wherein the first prism is adjacent to the second prism.

17. A display unit comprising:
a light source configured to emit a light; and
a polarizing splitting multiplexing device including a first prism configured to split the light into two polarized light beams having different optical path lengths, and a second prism configured to combine the two polarized light beams, wherein the first prism is cut out from one transparent plate and includes a first reflective surface and a first polarization splitting surface facing the first reflective surface, and the second prism is cut out from one of the one transparent plate and another transparent plate and includes a second reflective surface and a second polarization splitting surface facing the second reflective surface, and a half-wavelength film provided between a first end surface of the first prism and a second end surface of the second prism.

* * * * *